(12) United States Patent
Ono et al.

(10) Patent No.: US 6,964,013 B1
(45) Date of Patent: Nov. 8, 2005

(54) DOCUMENT EDITING SYSTEM AND METHOD OF PREPARING A TAG INFORMATION MANAGEMENT TABLE

(75) Inventors: Nobuhiro Ono, Kanagawa (JP); Tetsuji Fukaya, Kanagawa (JP); Yoshio Kataoka, Seattle, WA (US)

(73) Assignee: Kabushiki Kaisha Toshiba, Kawasaki (JP)

( * ) Notice: Subject to any disclaimer, the term of this patent is extended or adjusted under 35 U.S.C. 154(b) by 781 days.

(21) Appl. No.: 09/580,454

(22) Filed: May 30, 2000

(30) Foreign Application Priority Data

May 31, 1999 (JP) .............................. P11-152338

(51) Int. Cl.[7] .......................... G06F 15/00; G06F 7/00
(52) U.S. Cl. ..................... 715/513; 715/530; 715/901; 707/100; 707/102; 707/200
(58) Field of Search .............................. 715/513, 530; 715/901; 707/102, 5, 100, 200

(56) References Cited

U.S. PATENT DOCUMENTS

| | | | |
|---|---|---|---|
| 5,553,216 A * | 9/1996 | Yoshioka et al. ............ | 715/515 |
| 5,649,218 A * | 7/1997 | Saito .......................... | 715/513 |
| 5,745,745 A * | 4/1998 | Tada et al. .................... | 707/1 |
| 5,778,400 A * | 7/1998 | Tateno ........................ | 715/513 |
| 5,802,529 A * | 9/1998 | Nakatsuyama et al. ..... | 715/513 |
| 5,983,248 A * | 11/1999 | DeRose et al. ............. | 715/513 |
| 6,230,173 B1 * | 5/2001 | Ferrel et al. ................ | 715/513 |
| 6,330,574 B1 * | 12/2001 | Murashita ................... | 715/513 |
| 6,526,410 B1 * | 2/2003 | Aoyama et al. ............ | 707/102 |
| 6,535,875 B2 * | 3/2003 | Takahashi et al. ............. | 707/3 |
| 2002/0065814 A1 * | 5/2002 | Okamoto et al. .............. | 707/3 |
| 2004/0205598 A1 * | 10/2004 | Takahashi et al. .......... | 715/513 |

OTHER PUBLICATIONS

"Introduction to HTML 4," http://www.w3.org/TR/html4/intro/intro.html#h-2.3.4, pp. 1-7.
"Hypertext Markup Language Home Page," W3C HTML 4.01 Specification (http://www.w3.org/TR/html4/cover.htme); W3C Recommendation; Dec. 24, 1999, pp. 1-11.
"Extensible Markup Language (XML)," W3C Extensible Markup Language (XML) 1.0 (http://www.w3.org/TR/1998/RE-xml-19980210); W3C Recommendation; Feb. 10, 1998, pp. 1-6.

* cited by examiner

*Primary Examiner*—William Bashore
*Assistant Examiner*—Chau Nguyen
(74) *Attorney, Agent, or Firm*—Oblon, Spivak, McClelland, Maier & Neustadt, P.C.

(57) ABSTRACT

A document editing system is described and is to solve a problem of a background technology, that is, a problem of incapability of distinguishing, a plurality of document areas which are nested or which partially overlap and are specified through use of tags of the same type. Document area management means and tag management means assign nonoverlapping, unique IDs to arbitrary document areas, wherewith a tag information management table for managing document areas is retained in the document editing system.

14 Claims, 21 Drawing Sheets

FIG.5

| TAG KIND | TAG ID | TITLE | START INDEX | END INDEX | EXTENDED ATTRIBUTE 1 | EXTENDED ATTRIBUTE 2 |
|---|---|---|---|---|---|---|
| r | 1 | PROCESSING FOR CORRECT ANSWER | 152 | 236 | THIS PROCESSING… | NULL |
| r | 2 | PROCESS FOR INCORRECT ANSWER | 252 | 328 | THIS PROCESSING… | NULL |
| r | 3 | PROCESSING FOR OUTPUTTING ANSWER | 56 | 742 | THIS PROCESSING… | NULL |
| r | 4 | MAIN FUNCTION | 330 | 476 | THIS PROCESSING… | NULL |
| ⋮ | ⋮ | ⋮ | ⋮ | ⋮ | ⋮ | ⋮ |

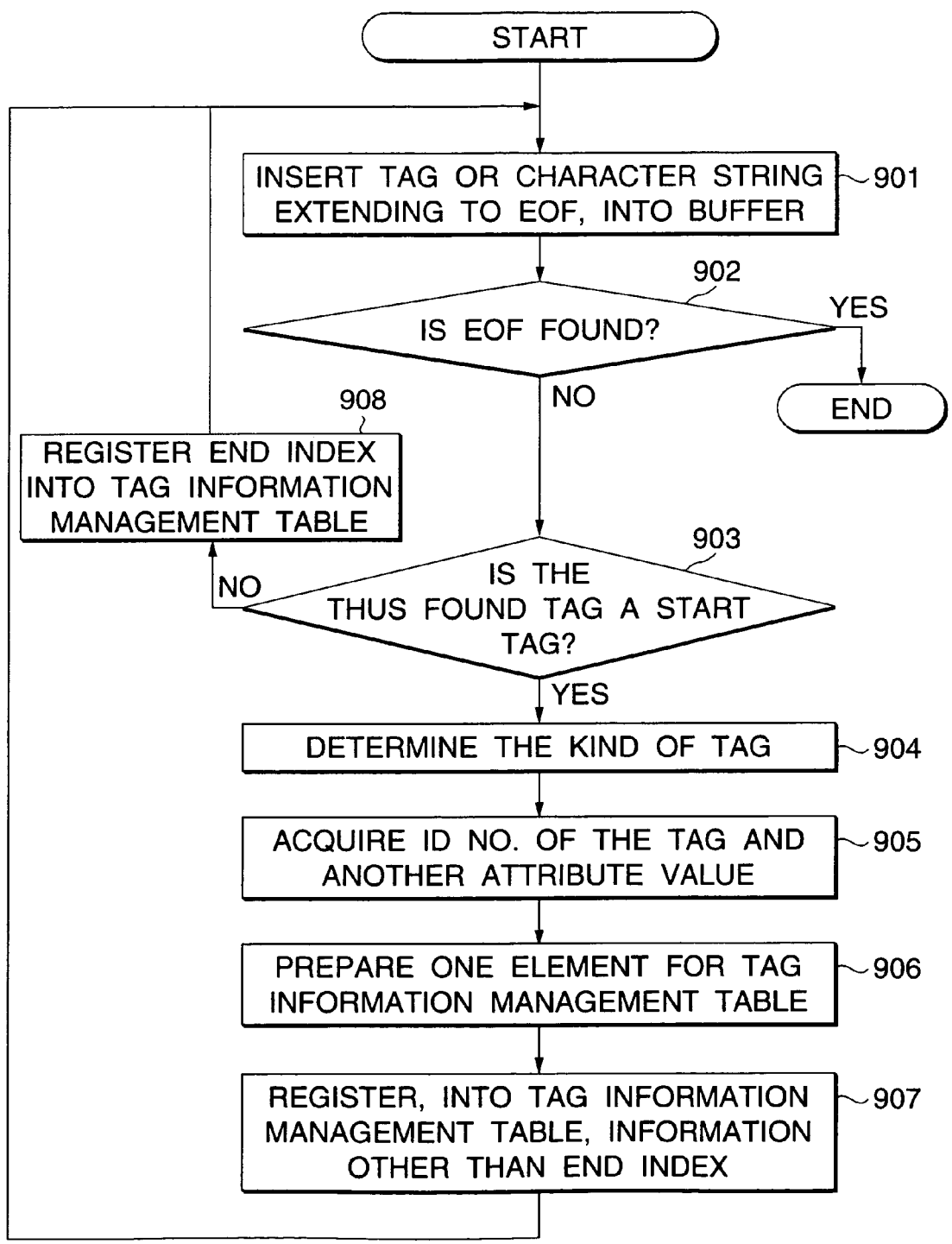

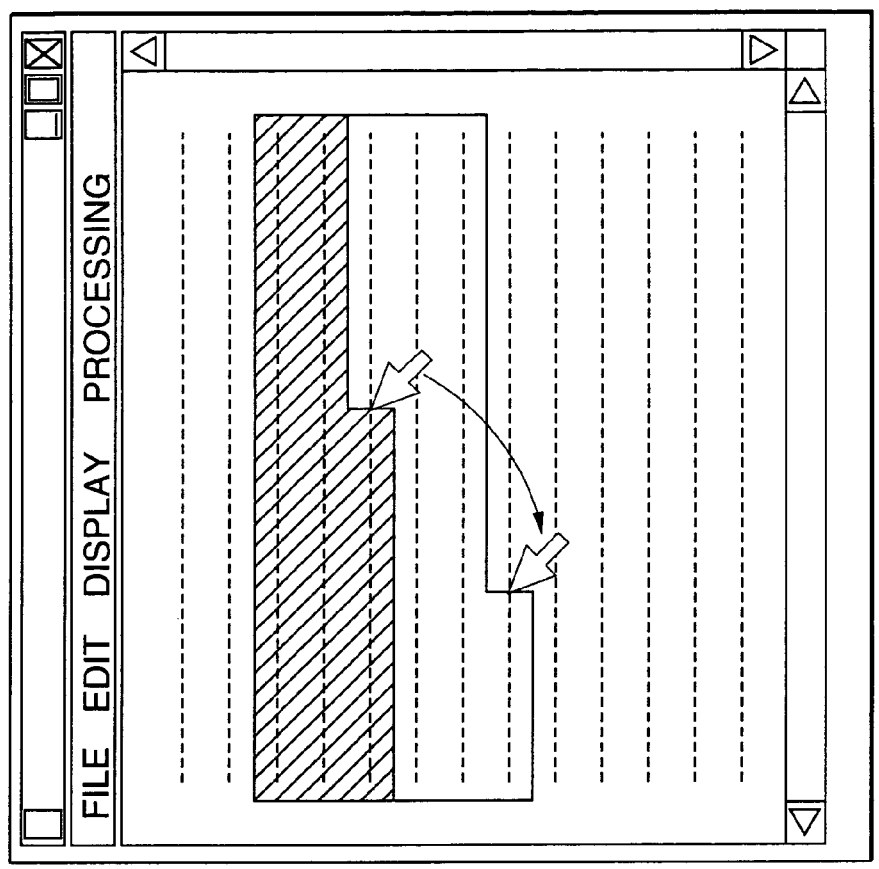
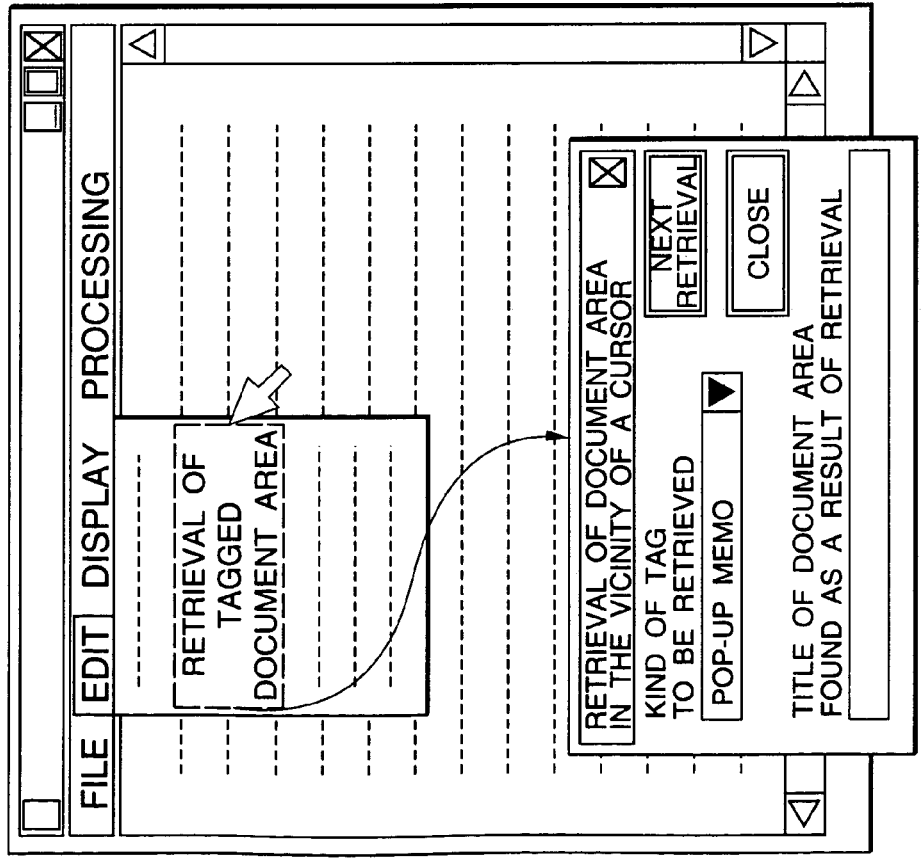
FIG.10B
FIG.10A

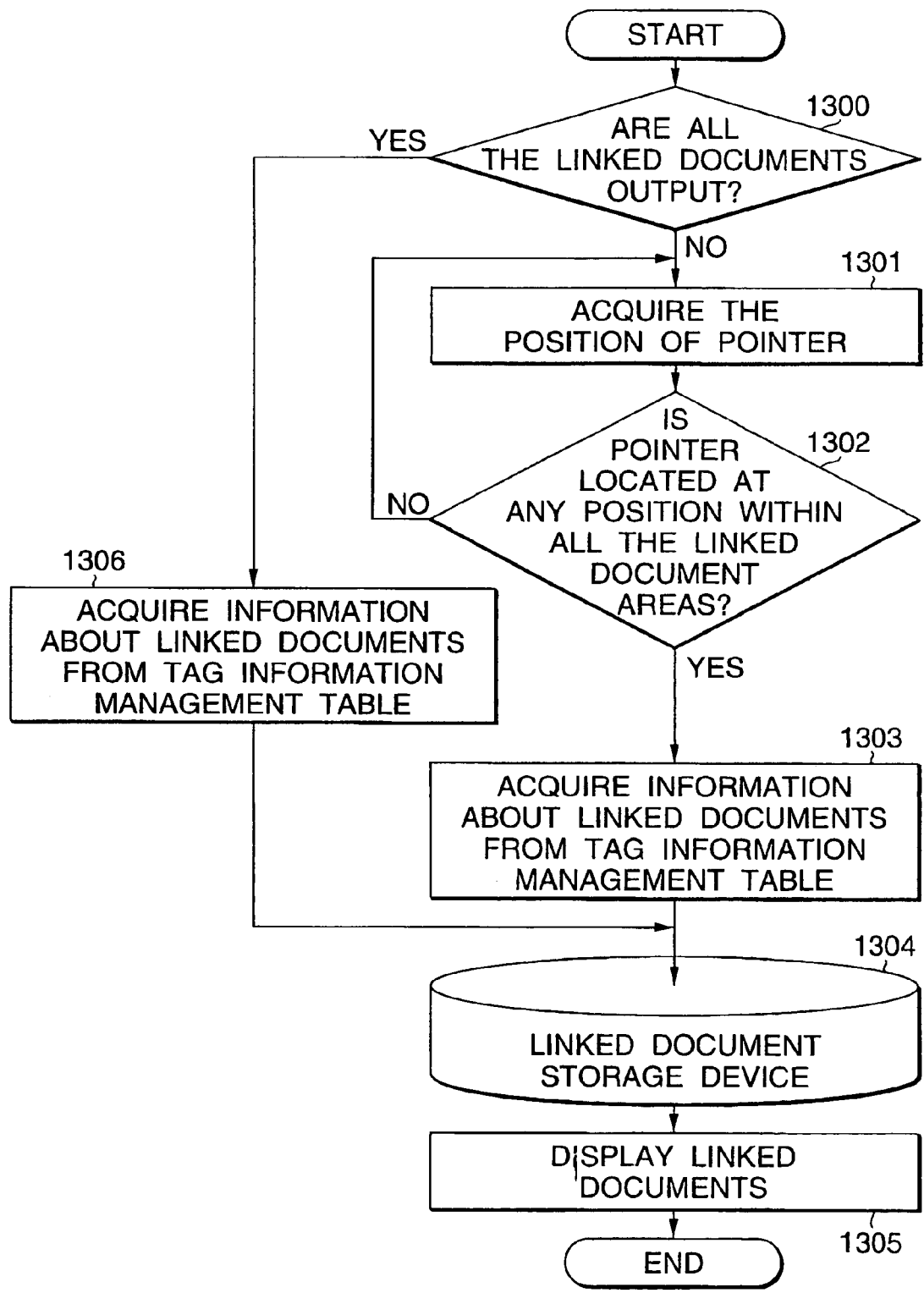

REVERSE INDEXING OF LINKED DOCUMENT AREAS

DISPLAYING OF ALL LINKED DOCUMENTS

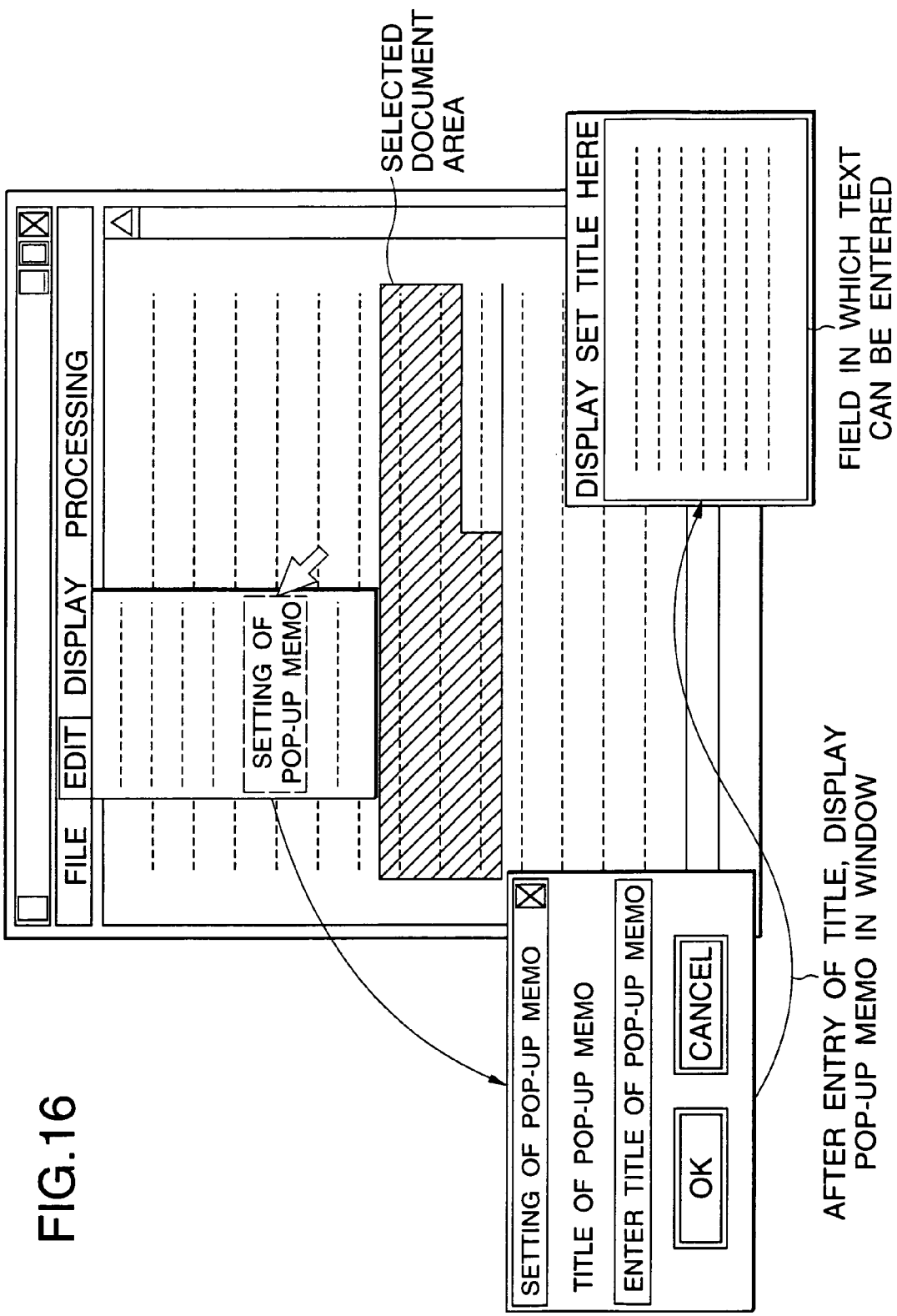

DOCUMENT AREA DEFINED BY A BRACE PAIR

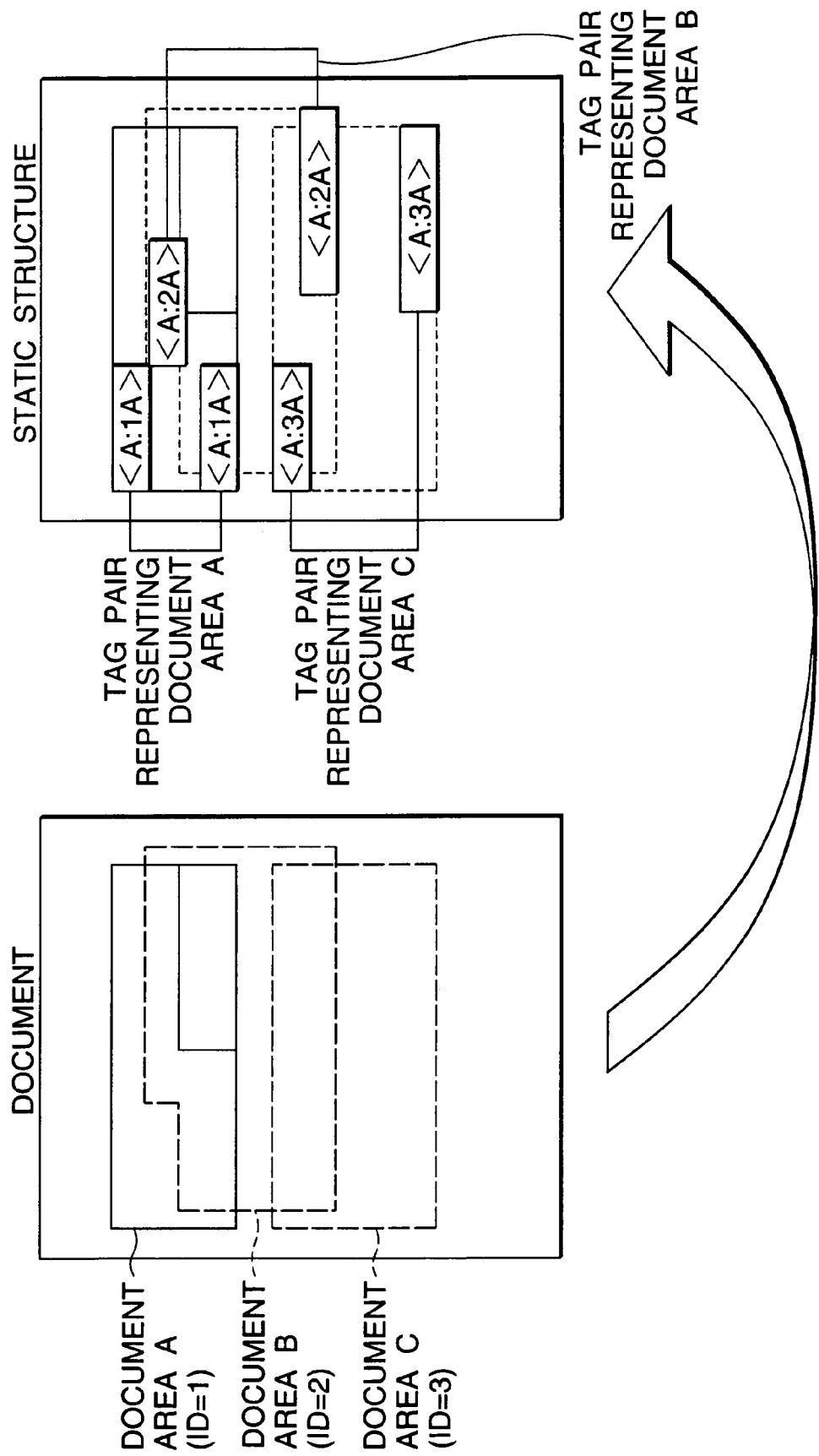

DOCUMENT EDITING SYSTEM AND METHOD OF PREPARING A TAG INFORMATION MANAGEMENT TABLE

BACKGROUND OF THE INVENTION

1. Field of the Invention

The present invention relates to a document editing system and a method of preparing a tag information management table for use in editing a document.

2. Description of the Related Art

In the case of a commonly known markup language, such as HTML or XML, when an arbitrary, non-empty document area within a target document is specified, markup indicating a start position is inserted at the start position of the document area, and markup indicating an end position is inserted at the end position of the document area. In the following description, a symbol which acts to insert at an arbitrary position within a document is called a "tag." A document area located between a start tag for specifying the start position of a document area desired to be specified and an end tag for specifying an end position is identified as a specified document area by a processor capable of understanding the markup language used for describing the document. The start tag and the end tag are of the same type and are paired up with each other.

In a case where a document area specified by a paired start and end tag is nested into another document area specified by a paired start and end tag of the same type or where one document area partially overlaps another document area, a processor capable of comprehending a commonly known markup language used for the document cannot uniquely distinguish which end tag is paired up with a given start tag, and therefore the processor cannot distinguish the document areas specified by the corresponding paired tags.

Thus, the background technology poses a problem of incapability of distinguishing, a plurality of document areas which are nested or which partially overlap and are specified through use of tags of the same type. Such a limitation imposed on the background technology may be translated into a problem of a low degree of freedom in adding attributes to a document through use of tags.

SUMMARY OF THE INVENTION

The present invention has been conceived to solve such a problem with the background art and is aimed at providing a document editing system capable of specifying a plurality of document areas which are nested or which partially overlap, through use of tags of the same type, significantly improving the degree of freedom in appending attributes to the document by implementation of an environment where document areas can be uniquely distinguished from one another, and flexibly representing the document assigned the attributes.

In order to achieve the objective, the present invention provides a document editing system for editing a document in a computer, the system comprising:

document area management means for discriminating a plurality of types of document areas or a plurality of document areas specified within an arbitrary area of the document and managing the document areas along with attributes assigned thereto;

tag management means for managing generation and deletion of a tag pair, that is, a start tag and an end tag, which uniquely correspond to each other and specify a document area; and document editing means for editing a character sequence provided in the document while information about the specified document area within the document is retained or updated.

Accordingly, the present invention enables specifying of a plurality of document areas which are nested or which partially overlap, through use of tags of the same type. Therefore, there is embodied an environment where document areas can be uniquely distinguished from one another, thereby significantly improving the degree of freedom in appending attributes to the document and enabling the user to flexibly edit a document.

Further, the present invention provides a document editing system for editing a document in a computer, the system comprising:

document area management means for discriminating a plurality of types of document areas or a plurality of document areas specified within an arbitrary area of the document and managing the document areas along with attributes assigned thereto;

tag management means for managing generation and deletion of a tag pair, that is, a start tag and an end tag, which uniquely correspond to each other and specify a document area;

document editing means for editing a character sequence provided in the document while information about the specified document area within the document is retained or updated;

link management means for performing a management operation so as to link one or a plurality of documents to the specified document area and passing information about the link to the document area management means; and linked document output means for outputting the document linked by the link management means, by reference to information about the document area managed by the document area management means.

Further, the present invention provides a document editing system for editing a document in a computer, the system comprising:

document area management means for accurately discriminating a plurality of document areas specified within the entirety of the document or arbitrary portions thereof and managing the document areas along with attributes assigned thereto;

tag management means for managing generation and deletion of a tag pair, that is, a start tag and an end tag, which uniquely correspond to each other and specify a document area;

document editing means for editing a character sequence provided in the document while information about the specified document area within the document is retained or updated;

display format management means for managing an arbitrary display format assigned to the document area managed by the document management means; and document output means for outputting the document managed by the document area management means, in an arbitrary expression format provided in the display format management means.

The present invention also provides a document editing system for editing a document in a computer, the system comprising:

document area management means for accurately discriminating a plurality of document areas specified within the entirety of the document or arbitrary portions thereof and managing the document areas along with attributes assigned thereto;

tag management means for managing generation and deletion of a tag pair, that is, a start tag and an end tag, which uniquely correspond to each other and specify a document area;

document editing means for editing a character sequence provided in the document while information about the specified document area within the document is retained or updated;

processing interface management means for performing a management operation so as to relate an arbitrary process to the specified document area such that a trigger for executing the process is set for the specified document, as well as to pass information about the link to the document area management means; and a processing library for storing, such as a library, the arbitrary processes linked to the specified document area by the processing interface management means.

The present invention provides a method of preparing a tag information management table for editing a document, the method comprising:

a character string selection determination step of determining whether or not an arbitrary character string within a document is selected;

a tag information acquisition step of, in a case where in the character string selection determination step it is determined that the character string is selected, acquiring information about the kind of tags assigned to a document area and information about the position of a start tag and that of an end tag;

an ID assignment step of assigning nonoverlapping tag IDs to the respective tag information pieces acquired in the tag information acquisition step; and a tag information management table storage step of storing into a tag information management table for use in editing a document, a link between the tag IDs assigned to the tags in the tag ID assignment step and the tag information pieces acquired in the tag information acquisition step.

Thus, there is provided a tag information management table for enabling unique discrimination of a plurality of document areas which partially overlap.

BRIEF DESCRIPTION OF THE DRAWINGS

FIG. 5 is an illustration showing an example tag information management table according to the embodiment shown in FIG. 1;

FIG. 9 is a processing flow chart according to which a tag information management table according to the first embodiment is prepared;

FIGS. 10A and 10B are illustrations depicting an example operation for editing a composite document according to the first embodiment;

FIG. 13 is a flowchart showing the flow of an operation for displaying the document linked to the composite document according to the embodiment shown in FIG. 1;

FIG. 16 is an illustration depicting an example screen display for setting a document area in the composite document according to the embodiment shown in FIG. 1;

FIG. 23 is an illustration showing the static structure of a composite document according to the present invention.

DETAILED DESCRIPTION OF THE PREFERRED EMBODIMENTS

A document editing system according to an embodiment of the present invention will now be described in detail by reference to the accompanying drawings. An important term used in the following description is defined as follows:

A "composite document" is a document which, in its entirety or in arbitrary positions, can be linked to another document (1); for which an arbitrary display format is set (2); and for which a trigger is set for relating arbitrary processing to the document or for executing arbitrary processing (3).

Figure 20:
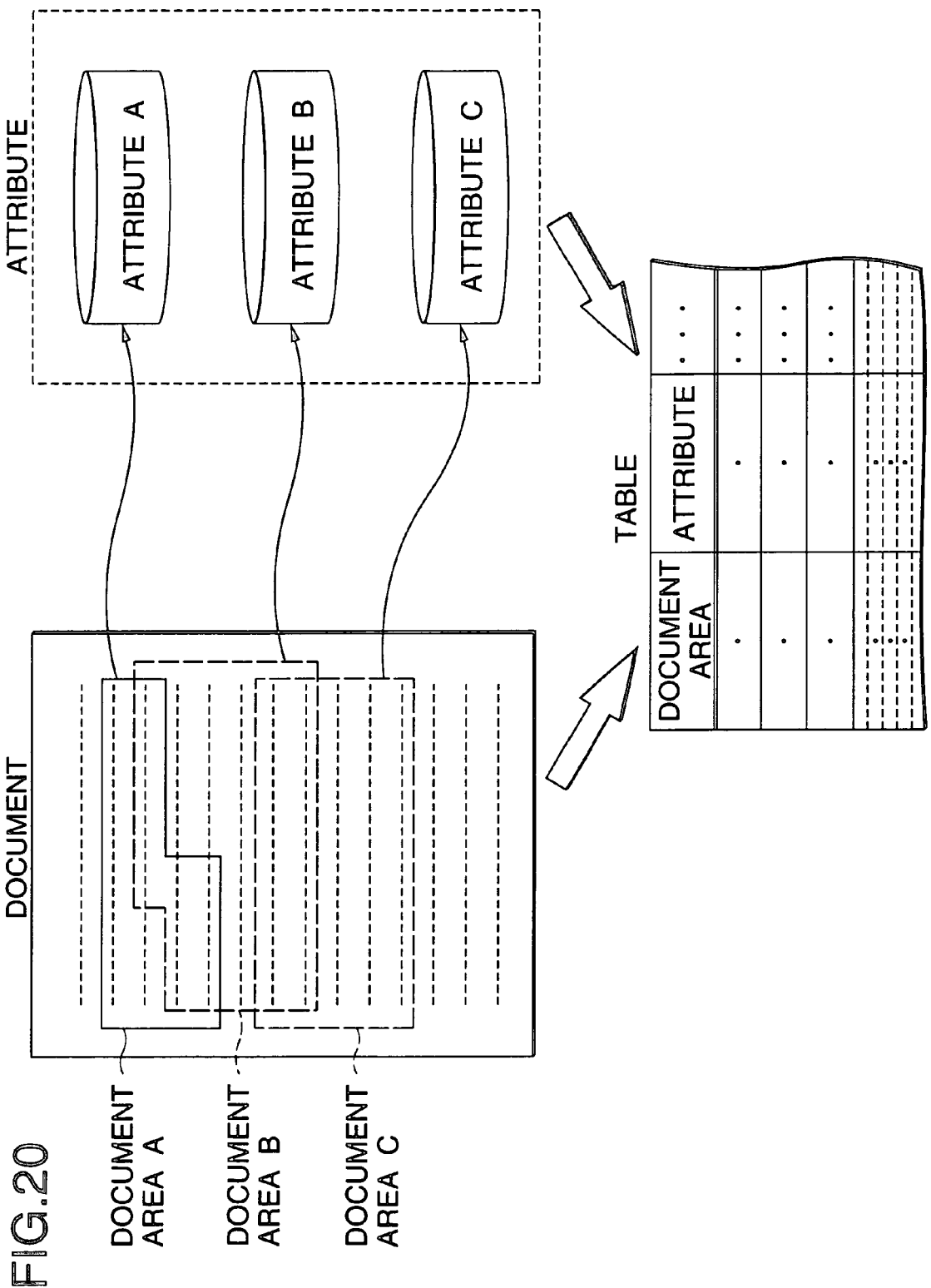
FIG. 20 is an illustration depicting a link between a commonly known composite document and a table.

FIG. 20 is a schematic diagram showing a composite document whose internal areas are assigned attributes. As shown in FIG. 20, arbitrary document areas within the document (i.e., a document area A, a document area B, and a document area C) are assigned respective attributes (attribute A, attribute B, and attribute C). Information about the attributes assigned to the corresponding document areas is statically retained, thereby enabling reference to the attributes assigned to the respective document areas. In the example shown in FIG. 20, the information about attributes is expressed as a table for retaining links between the document areas and their assigned attributes.

Figure 21:
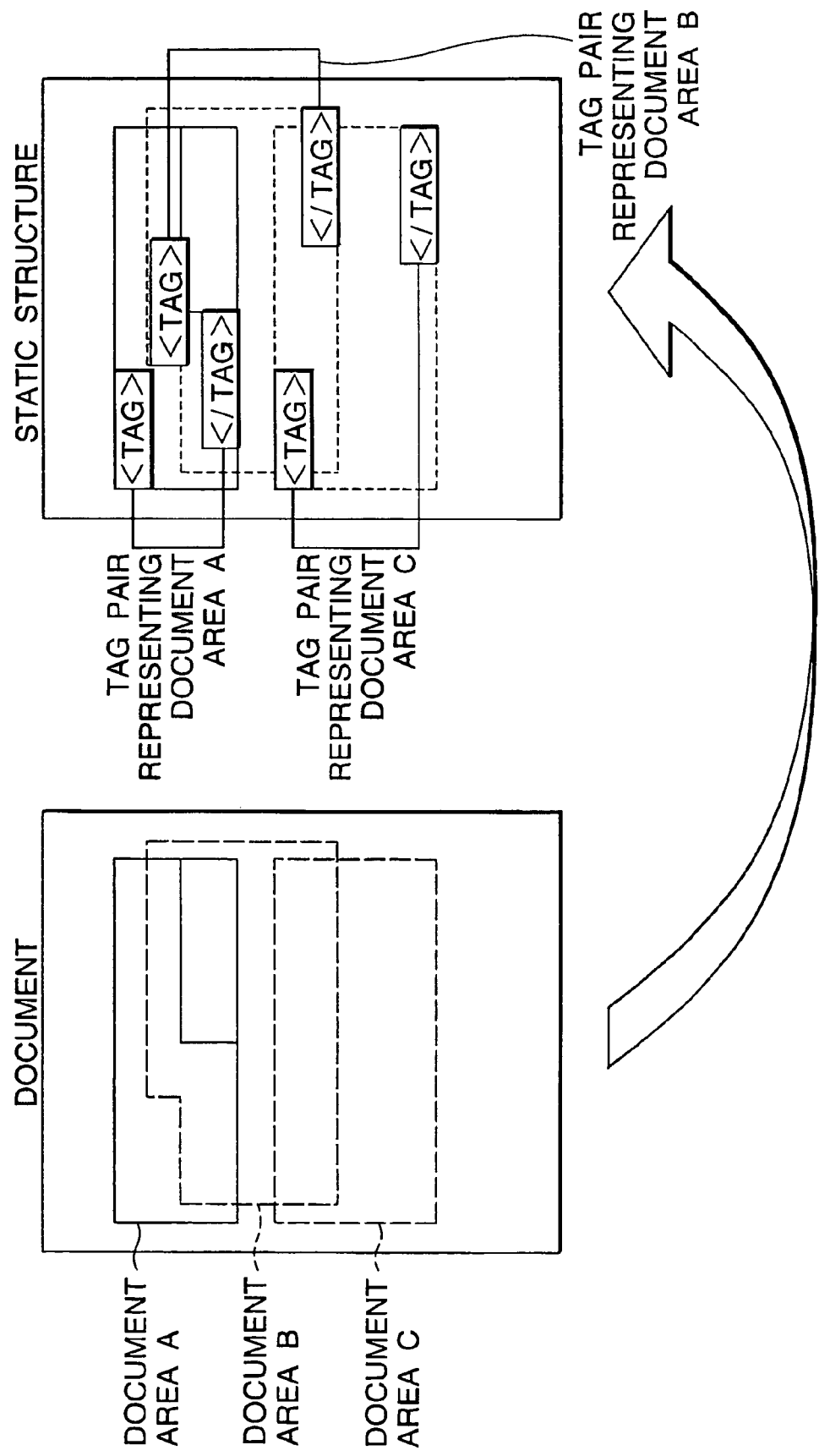
FIG. 21 is an illustration depicting a problem arising in handling the commonly known composite document.

Even in the case of a commonly known markup language, such as HTML, attributes can be assigned to a document area by means of attaching a tag to the document area. However, for a reason to be described later, it cannot necessarily be said that the degree of freedom in assigning attributes to the commonly known markup language is high. In a case where an overlap exists between arbitrary document areas within a document assigned attributes of the same type, the boundary between the document areas becomes indefinite. FIG. 21 shows a static structure, in which document areas assigned attributes of the same type are expressed through use of tags. As is obvious from FIG. 21, if the document areas are expressed through use of tags of the same type, the document areas cannot be definitely specified. For example, an end tag to be paired up with the start tag of the document area C can be also taken as the end tag of the document area B.

Figure 22:
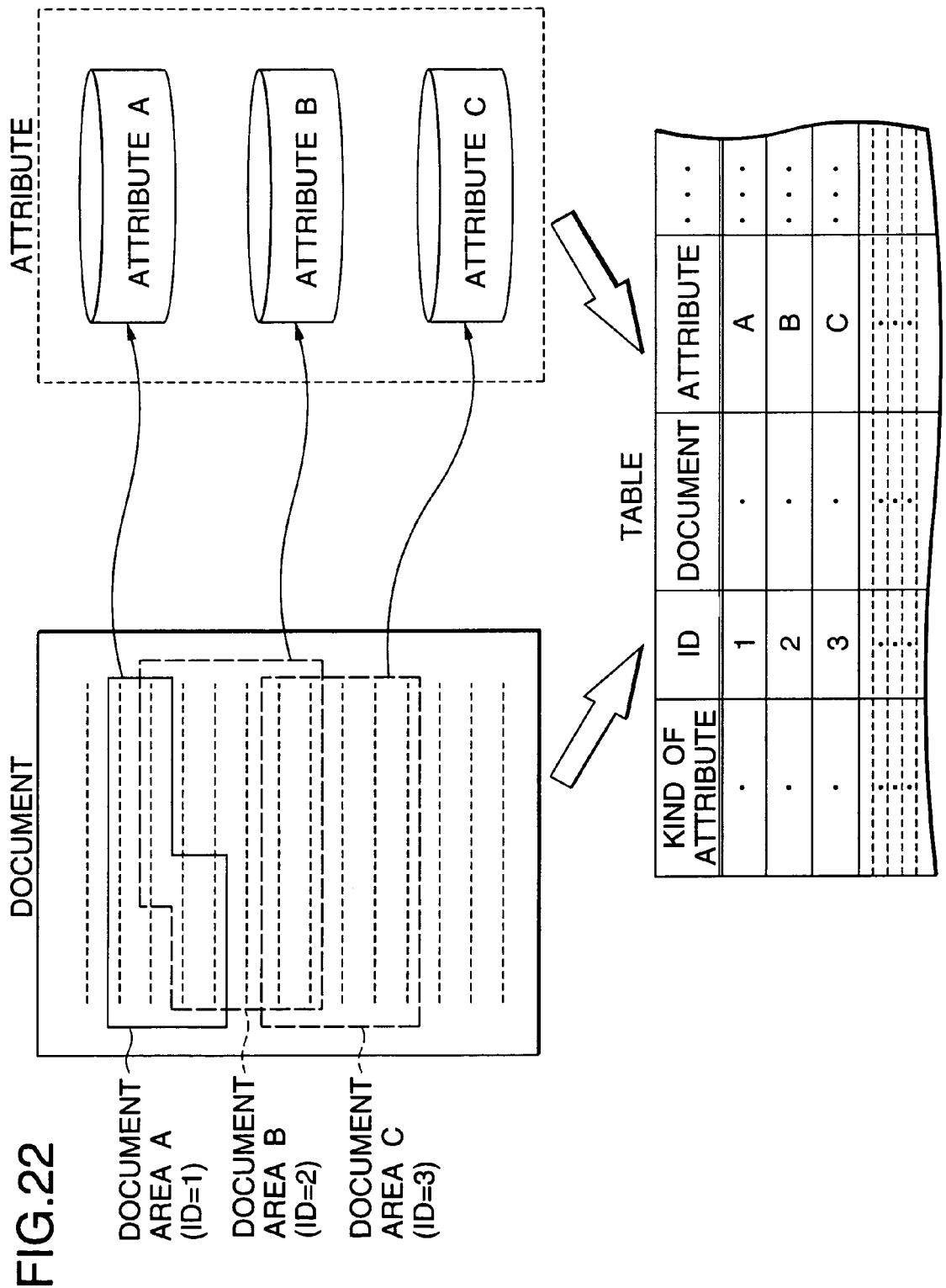
FIG. 22 is an illustration depicting an example link between a composite document and a table according to the present invention.

To solve such a problem, unique numbers (IDs) which prevent an overlap among the document areas within the document shown in FIG. 20 are assigned to the document areas. As a result, the table shown in FIG. 20 is rewritten as shown in FIG. 22. Addition of unique, nonoverlapping numbers (IDS) results in an increase in the amount of data pertaining to the table holding the information about the links between document areas and their assigned attributes. In FIG. 22, the attributes shown in FIG. 20 are divided into the types of attributes linked to document area and attribute values thereof. In this example, numerals 1, 2, and 3 are used as unique numbers (IDS) for specifying tag pairs. Any type of identifiers may be used, so long as the identifiers are nonoverlapping and unique.

The table is additionally provided with unique, nonoverlapping numbers (IDs) and holds the information about the links between the document areas and their assigned attributes. FIG. 23 shows a static structure-expressed through use of tags. In contrast with the static structure shown in FIG. 21, the static structure shown in FIG. 23 enables unique identification of a tag pair defining each document area, through use of unique, nonoverlapping numbers (IDS) assigned to a respective start tag and a respective end tag.

The document editing system of the present invention supports a composite document and editing thereof, by means of enabling identification of arbitrary document areas within a document assigned tags. The document editing system has one or more fields or windows for expressing a composite document, and texts having the characteristic of the composite document are displayed in the fields or windows. The following descriptions are based on a case where, by way of an example, a composite document comprising source codes, such as a C language document, is taken as a document.

Figure 1:
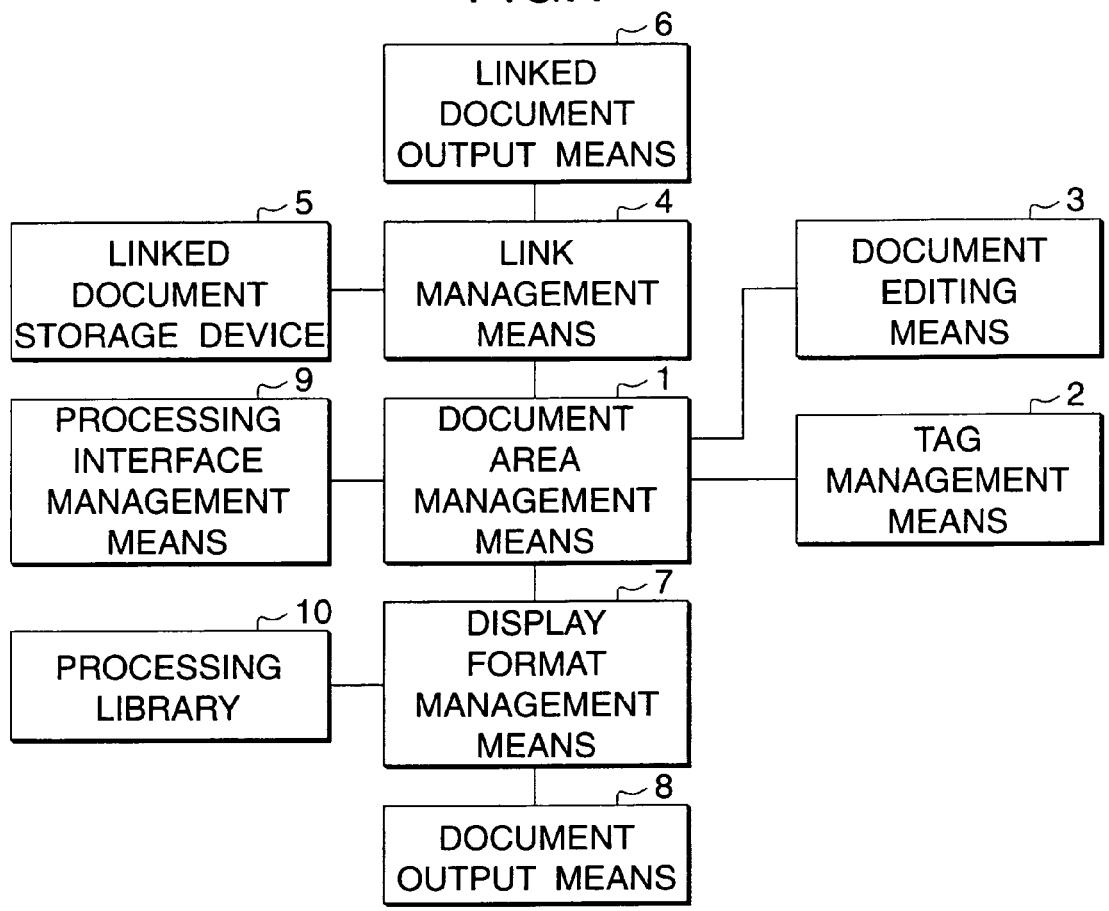
FIG. 1 is a block diagram schematically showing the configuration of a document editing system according to an embodiment of the present invention.

FIG. 1 is a block diagram showing the overall configuration of the document editing system of the present invention.

As shown in FIG. 1, the document editing system comprises document area management means 1; tag management means 2; document editing means 3; link management means 4; a linked document storage device 5; linked document output means 6; display format management means 7; document output means 8; processing interface management means 9; and a processing library 10.

In the document editing system,
(1) the document area management means 1, the tag management means 2, the document editing means 3, the link management means 4, the linked document storage device 5, and the linked document output means 6 are involved in relating a document with another document;
(2) the document area management means 1, the tag management means 2, the document editing means 3, the display format management means 7, and the document output means 8 are involved in selecting an arbitrary display format; and
(3) the document area management means 1, the tag management means 2, the document editing means 3, the processing interface management means 9, and the processing library 10 are involved in setting a trigger for relating arbitrary processing to a document area. Thus, the document editing system supports a composite document.

The document area management means 1 stores tag information for supporting the composite document which has been defined previously, and manages document areas within a composite document by means of managing accesses to the information, such as writing or reference.

The tag management means 2 manages the user of the document editing system in assigning tags to arbitrary document areas. In a case where a tag is added or assigned to a document area, a tag attribute value for uniquely specifying a start tag and an end tag, a tag attribute value representing the title of a document area, and tag attribute values of the document area are added to the tag information. If necessary, extended tag attributes may be added to the tag information. The information about the document assigned the tag is passed to the document area management means 1. In a case where a tag is deleted, the start and end tags to be deleted are specified on the basis of the tag attribute values allocated to the start and end tags, and the tag information about the document-area whose tags have been deleted is passed to the document area management means 1, thereby releasing the corresponding document area.

By means of the document area management means 1 and the tag management means 2, nonoverlapping, unique numbers (IDs) are assigned to arbitrary document areas, as mentioned previously. A table for managing the document areas is retained in the document editing system. As a result, the document editing system can assign tags to arbitrary document areas within a composite document for allocating attributes to corresponding document areas.

Figure 2:
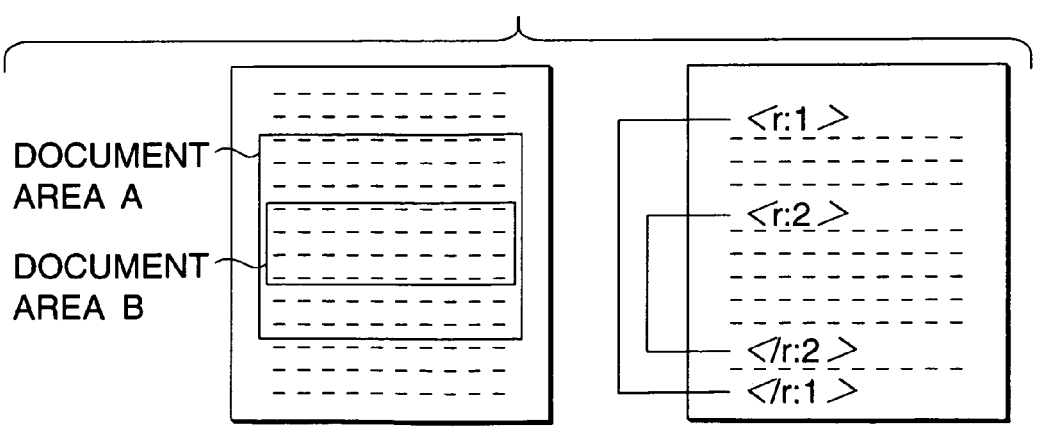
FIG. 2 is an illustration showing an example in which document areas which are nested and overlap, according to the embodiment shown in FIG. 1.

The document area management means 1 can specify, as a document area to be managed, a document area A in which another document B is nested, as shown in FIG. 2, or document areas A and B partially overlapping each other. Such a function of the document area management means 1 differs from a function for indicating hypertext as typified by a commonly known HTML browser.

Figure 3:
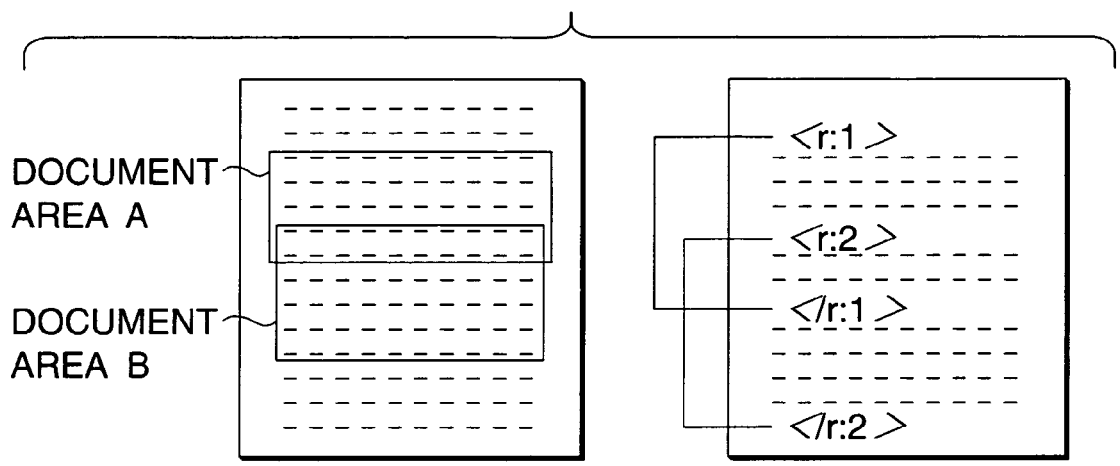
FIG. 3 is an illustration showing an example in which document areas which partially overlap, according to the embodiment shown in FIG. 1.

In an overlapping document area between the document area A and the document area B shown in FIGS. 2 and 3, information about the start and end tags of the document area A and information about the start and end tags of the document area B are embedded in the overlapping document area. Further, by means of combination of patterns of overlapping between document areas such as those shown in FIGS. 2 and 3, the document area management means 1 allows any type of combination of patterns of overlapping among a plurality of document areas.

In a case where the user of the document editing system subjects a composite document to text editing, the document editing means 3 manages a change in the document area specified by the tags, which are embedded in the document managed b the document area management means 1, and passes the resultant updated tag information to the document area management means 1. In a case where a document area assigned a tag is deleted in the course of editing of the document, the document editing means 3 specifies the start and end tags assigned to the document area to be deleted, by means of the tag management means 2 and on the basis of the attributes values assigned to the respective tags. The resultant updated tag information is passed to the document area management means 1, thus releasing the corresponding document region.

The link management means 4 manages the document linked with the tagged document areas managed by the document area management means 1.

The linked document is stored in the linked document storage device 5, and the link management means 4 manages a pointer to the linked document. In response to a request for displaying a linked document, the link management means 4 refers to the linked document and passes information about the linked document to the linked document output means 6. In many cases, the linked document storage device 5 is embodied by a mass-storage device provided in a personal computer or a workstation or BY a mass-storage device connected to a network.

The display format management means 7 manages the display format of a composite document in accordance with the attributes of the tagged document areas, the attributes being specified by the tags. The display format management means 7 determines the display format specified by the user of the document editing system. On the basis of the attributes of the tagged document areas managed by the document area management means 1, the display format management means 7 changes the format of display of the composite document and passes to the document output means 8 information about the thus changed display format.

In order to assign to an arbitrary area within a document an attribute for performing a predefined process, the processing interface management means 9 relates a predefined process to the document area specified by the user of the document editing system. If necessary, the processing interface management means 9 receives an input of an initial value and sets and manages a trigger for performing a predefined process, according to the type of the predefined process. The predefined process is stored, as a file described in a script, in the processing library 10. In many cases, the processing library 10 is embodied by a mass-storage device provided in a personal computer or by a workstation or a mass-storage device connected to a network.

The operation of the document editing system of the present invention will now be described.

First, the operation of the document area management means 1 of the document editing system will be described by reference to corresponding drawings.

Figure 4:
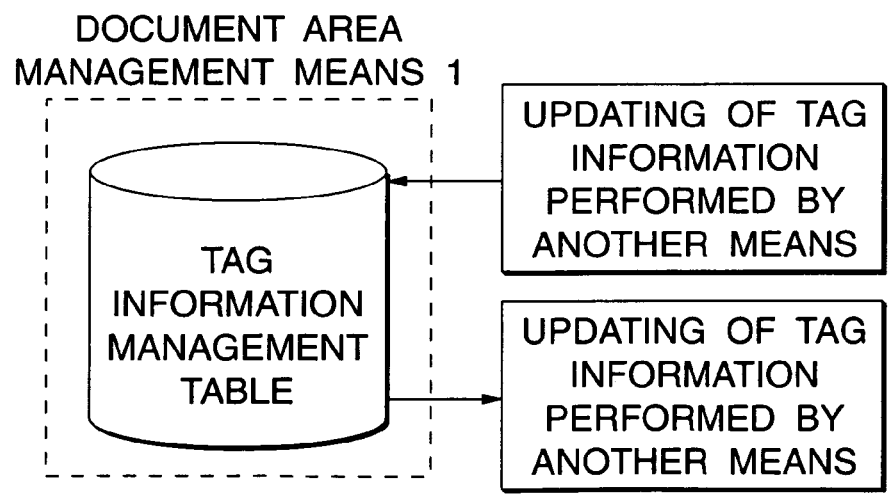
FIG. 4 is an illustration showing an example access to a tag information management table of document area management means 1 according to the embodiment shown in FIG. 1.

As mentioned previously, the principal role of the document area management means 1 is to internally hold a table for managing document areas. As shown in FIG. 4, by means of a tag, by means of access, as will be described later, the document area management means 1 manages another means in adding, changing, or deleting information about the document area which is stored in the table and assigned an attribute.

Here, the table for managing document areas is called tag information management table and will be described by reference to the drawing. As shown in FIG. 5, the tag information management table is provided with a declaration indicating the kind of tag. As attribute values of the tag, there are held a tag ID number (tag id), the title of a document area which is to be assigned the tag (title), an index indicating the start position of the document area which is to be assigned the tag (start index), an index indicating the end position of the document area which is to be assigned the tag (end index), and other attribute values for extension purposes. The expression "kind of tag" used herein designates the kind of tag, such as an anchor tag "<A>" or a font tag "<FONT>," used in HTML, which is a typical markup language. In the document editing system, the tag ID number is synonymous with a nonoverlapping, unique attribute value which has already been described as a value to be added to a respective start tag and a respective end tag so as to enable unique identification of the start tag and the corresponding end tag, to thereby embody a composite document. Although the example shown in FIG. 5 illustrates a single kind of tag "r," in actuality there is prepared a table providing a summary of a plurality of kinds of tags used in a composite document or there are prepared a plurality of tables corresponding to the respective kinds of tags.

The table, which manages the tag information to be prepared by the document area management means 1, is prepared at all times so that the table can be used at the time of browsing, editing, or reservation of a document. The document editing system handles a document simultaneously with registration of table elements. In association with editing of a document, table elements are changed dynamically. Further, in association with completion of handling of a document, the elements registered in the table are discarded.

The operation of the tag management means 2 of the document editing system will be described by reference to corresponding drawings. The tag management means 2 plays a dominant role in the document editing system of the present invention; specifically, the tag management means 2 generates and adds to a document area a nonoverlapping, unique tag attribute required for assigning the feature of a composite document to a plain text.

Figure 6:
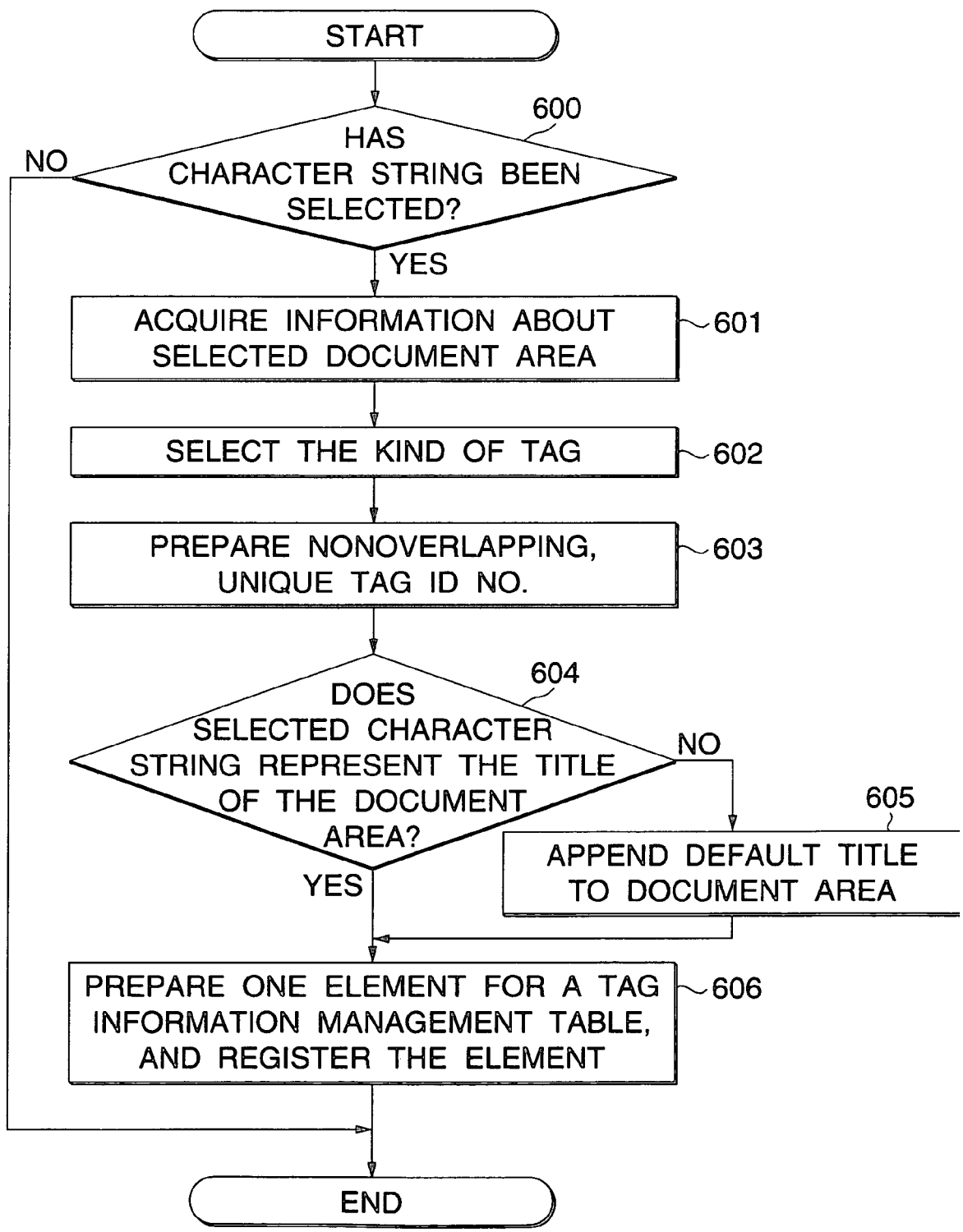
FIG. 6 is a flowchart showing the flow of operation performed by tag management means 2 according to the embodiment shown in FIG. 1.

FIG. 6 is a flowchart showing the flow of operation of the tag management means 2 of the document editing system.

In order to set a document area, a document area to be tagged must be selected from the document displayed by the document editing system. Setting a document area not in existence as an area to be tagged is nonsense and therefore invalid. The tag management means 2 determines whether or not a character string is selected from the composite document (step 600). If it is determined that a character string has not yet been selected, a tagging operation is ended. In contrast, if it is determined that a character string has been selected, the tag management means 2 acquires information about a start index and an end index pertaining to the thus selected character string; i.e., a document area (step 601).

The tag management means 2 acquires information about the kind of tag specified by the user and receives an extended attribute value if the attribute value is required by the type of tag (step 602), thus preparing a nonoverlapping, unique tag ID number (step 603). The tag management means 2 sends to the user an inquiry about the title of a document area to be specified. In a case where the user enters the title, a character string representing the title is acquired as a document information title (step 604). In contrast, in a case where the user does not enter a title, the tag management means 2 acquires a default character string defined by the specified tags (step 605). Finally, the information pieces (the king of a tag, the tag ID number, the start index of the document area, the end index of the document area, and the extended attribute value) which have been acquired by the tag management means 2 thus far are passed, as a collective information piece, to the document area management means 1. The document area management means 1 registers, as table elements, the thus received tag information into the tag information management table, which is shown in FIG. 5 and has already been described (step 606). As a result of preparation of such a tag information management able within the document editing system, the document editing system enables handling of a document characterized as a composite document.

An output of composite document file is used in storing a plain text as a document file (i.e., a composite document file) having a static structure of a composite document, by mean of sequentially inserting tags into the plain text according to the information stored in the tag information management table internally stored in the document editing system.

Figure 7:
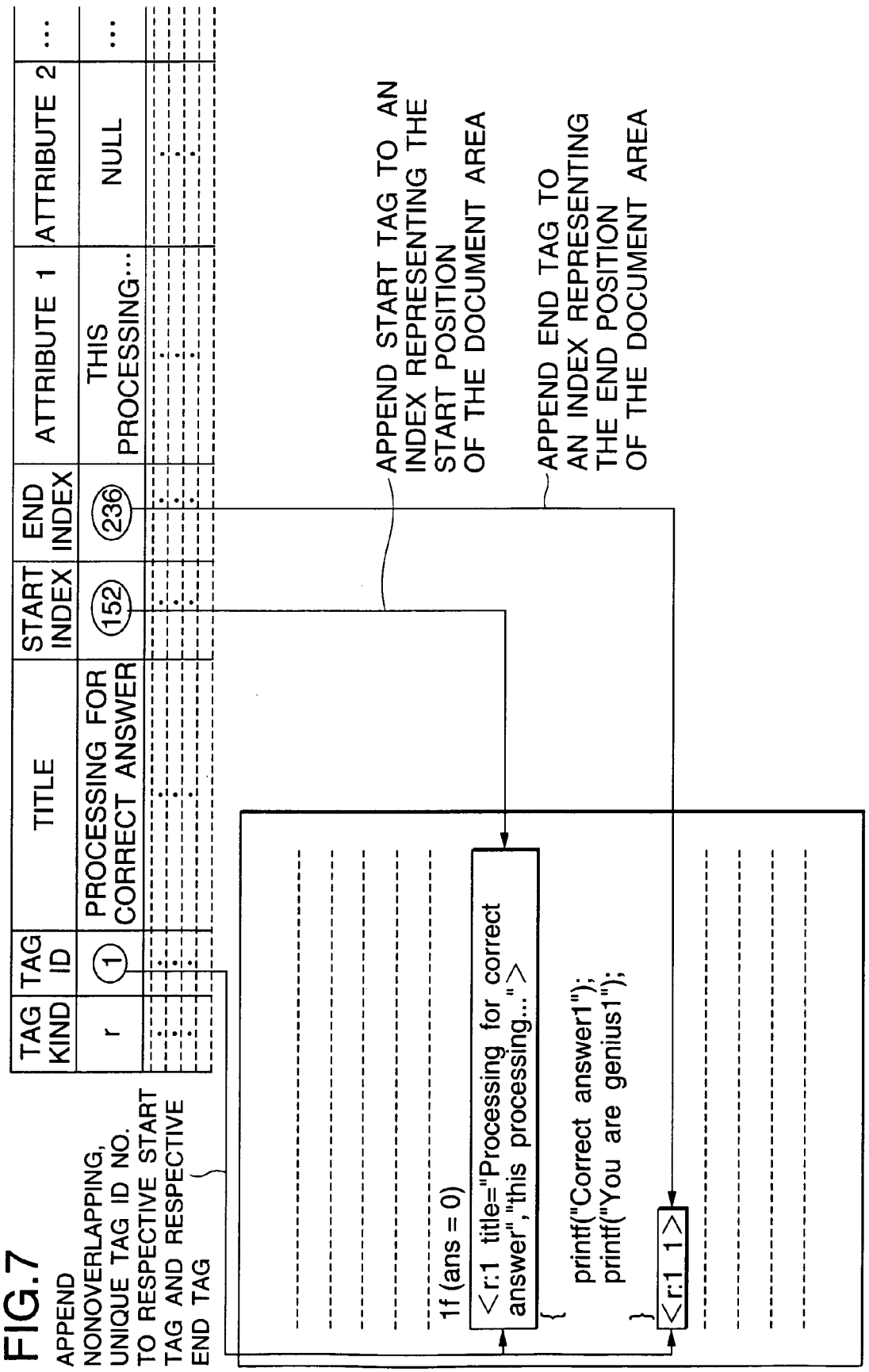
FIG. 7 is an illustration depicting assigning of a tag to a document area according to the embodiment shown in FIG.

FIG. 7 is an illustration showing allocation of tags while the elements provided in the first row of the tag information management table shown in FIG. 5 are taken as examples. In the example, text information is employed as an extended tag attribute value. In the case of a simple tag not having an extended tag attribute value, a tag attribute value for extension purpose is not written into the tag information management table. In the case of a tag having another extended tag attribute value, an extended tag attribute value corresponding to the kind of tag is written into the tag information management table. Further, in the case of a tag having a plurality of extended tag attribute values, the extended tag attribute values are consecutively written into the tag information management table while being separated from one another through use of delimiters.

Figure 8:
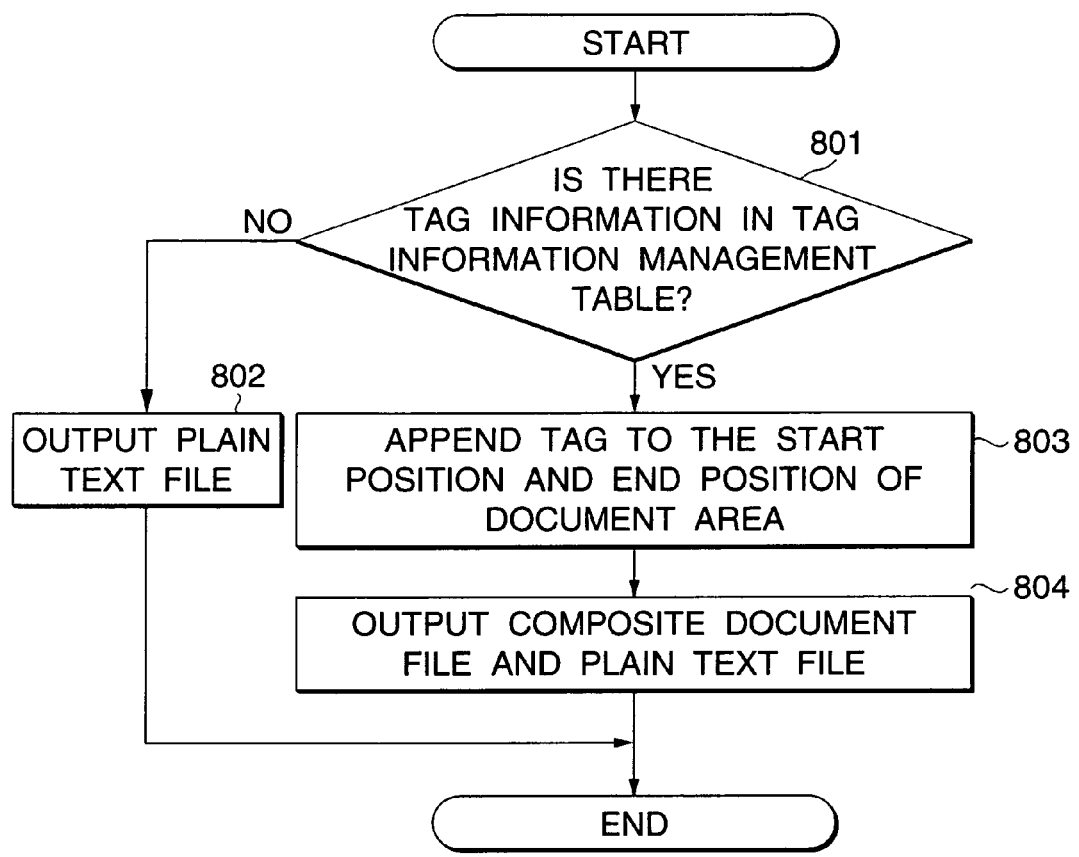
FIG. 8 is a processing flow chart according to which a composite document file according to the first embodiment is output.

FIG. 8 is a flowchart showing the flow of an operation in which the document editing system outputs a composite document file in accordance with the tag information management table.

A determination is made as to whether or not tag information is stored in the tag information management table (step 801). If no tag information is stored, a plain text file is output (step 802). In contrast, if tag information is stored, a tagged document area is present as a composite document. Tags corresponding to the kinds of tags held as elements in the tag information management table, such as those provided in the example shown in FIG. 7, are assigned to the plain text information at the position of a start index and at the position of an end index of the tagged document area stored in the tag information management table (step 803).

In the case of tags being assigned to a file to be output, attribute values of the tags must be written. In the case of a start tag, a nonoverlapping, unique ID number is added to the right side of a symbol indicating the kind of tag while a delimiter, such as a space, is interposed between the symbol and the ID number. The ID number is followed by the title of the tagged document area, and an attribute value for extension purpose while the symbol and the ID number are spaced apart from each other through use of a delimiter, such as a space. In the case of an end tag, a symbol indicating an end tag, such as "/" is assigned to the left side of the symbol indicating the kind of tag. The symbol indicating the kind of tag is followed by the same tag ID number as that appended to the right side of the start tag, while the symbol and the ID number are spaced apart from each other through use of a delimiter, such as a space. Appending the tag attribute to the end tag is the feature of the present invention which is not employed in the commonly known markup language.

Insertion of a tag is repeated in correspondent with the number of document area information pieces stored in the tag information management table, to thereby prepare a composite document file. The thus prepared composite document file is output (step 804).

By reference to the drawings, there will now be described the flow of an operation in which the document editing system analyzes tag information on the basis of the document file (i.e., a composite document file) which already has the static structure of a composite document and registers elements in the tag information management table.

FIG. 9 is a flowchart showing the flow of processing in which the document editing system analyzes the tags assigned to the composite document file and registers elements to the tag information management table.

The flow of operation required for analyzing the tags assigned to the composite document file, to thereby prepare a tag information management table, is as follows.

The composite document file is scanned from the beginning of the document to the end thereof so as to find a "tag" or "EOF (End of File)," and a buffer is inserted at any location in the character sequence (step 901). If EOF is found (step 902), it is determined that no tags are present in the document and that retrieval of the entire document has been completed, and processing is terminated.

In a case where a tag is found, a determination is made as to whether or not the thus found tag is a start tag (step 903). If the tag corresponds to a start tag, the kind of tag is determined (step 204). Following the determination, a non-overlapping, unique tag ID number, the title of a document area, and an extended tag attribute are acquired, and a start index of the document area is acquired on the basis of the position at which the tag is inserted (step 905). One element of the tag information management table of the document area management means 1 is prepared (step 906), and information pieces are registered (step 907). At this time, the end index of the document area still remains unregistered. Subsequently, processing jumps to step 901.

In a case where the found tag is an end tag, the start tag to be paired up with the end tag has already been retrieved and registered as an element in the tag information management table. By reference to the kind of tag and the tag ID number assigned to the tag, there is retrieved an element as which the information acquired by the start tag to be paired up with the end tag is registered in the tag information management table. The location at which the end tag is inserted is registered in a blank in which the end index of the document region has not yet been registered (step 908). The entries for all the elements are now filled.

As a result of the foregoing operations being repeated until EOF is found, acquisition of plain text information from which tags are removed and registration, into the tag information management table, of elements for embodying a composite document are completed. The thus acquired text information is displayed by the document editing system, as in the case of a commonly known editor.

There will now be described the editing of a composite document performed by the document editing system.

The information about the tag information management table having elements registered therein is automatically changed by the tag management means 2 and the document editing means 3 in association with text editing of the composite document displayed by the document editing system. It has already been stated by that, as a result of tags being assigned to an arbitrary document area, the tag management means 2 additionally registers elements in the tag information management table. Further, the tag management means 2 changes the document areas of the composite document which have already been assigned tags or deletes tagging information about the tagged document area. FIGS. 10A and 10B show an example operation in which the document editing system edits the tagged document areas of the composite document.

The document editing system has a menu for enabling editing of a tagged document area or the function of receiving an input entered by the user by means of key-operation of a so-called shortcut key. In an example shown in FIG. 10A, there is selected a "retrieval of a tagged area" which is a sub-menu item of an "edition" menu provided in a menu bar located at an upper position of the document editing system, thereby indicating a dialog box "retrieval of a document area in the vicinity of a cursor." The dialog box "retrieval of a document area in the vicinity of a cursor" has a field in which the user can specify the kind of tag to be retrieved. After having specified the kind of tag, the user retrieves a tagged document area existing in the vicinity of a cursor which is currently located within the composite document, by means of pressing a "next retrieval" button. If a document area matching the retrieval conditions is not found, a warning message "No document area matching the retrieval conditions is found" is indicated. In contrast, if the document area matching the retrieval conditions is found, the title of the tagged document area is indicated in a field "Title of a retrieved document area." Further, when the "Next retrieval" button is pressed, the title of the next candidate tagged document area is indicated. In the composite document display field of the document editing system, the thus retrieved and tagged document area is highlighted by means of, for example, reverse indication. The dialog "retrieval of a document area in the vicinity of a cursor" is terminated by means of pressing a "Close" button, whereby a highlighted area is left within the composite document.

FIG. 10B shows a change in the retrieved, highlighted, and tagged document area. As shown in FIGS. 10A and 10B, the highlighted, tagged document area is set at the start and end positions of the document area through use of a pointer, such as a mouse. The tagged document area can be freely changed within the composite document by means of moving the pointer. The tag management means 2 processes updating of the tag information resulting from these operations, by means of accessing and writing the updated tag information into the tag information management table of the document area management means 1. If the tagged document area is changed such that the document area has become zero after operation of a pointer, it is determined that the tagged document area has disappeared. In such a case, the tag management means 2 accesses the tag information management table of the document area management means 1, to thereby release corresponding tag information and delete the tagged document area.

Figure 11:
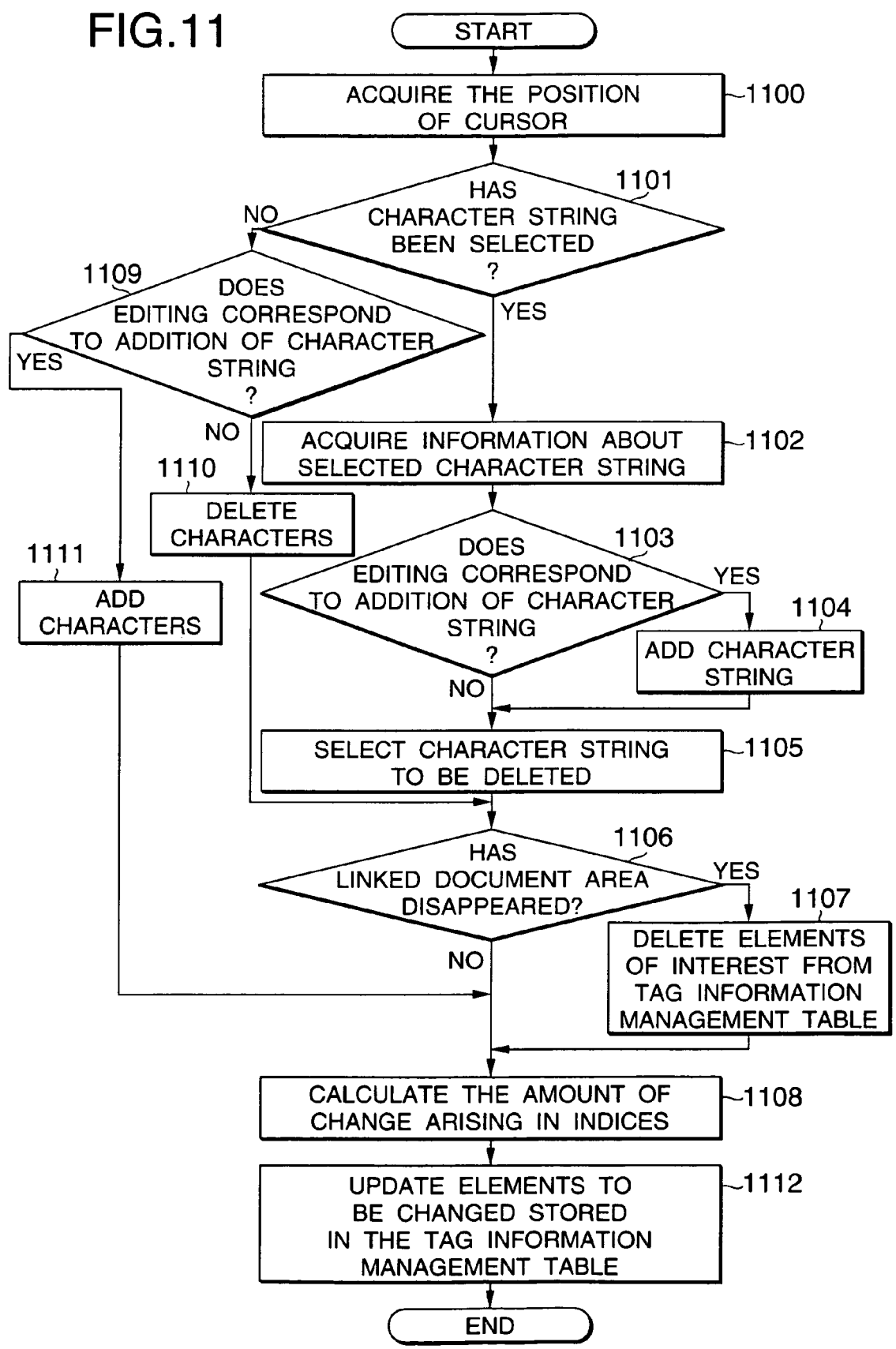
FIG. 11 is a processing flowchart depicting the processing of document editing means 3 according to the embodiment shown in FIG. 1.

The operation of the document editing means 3 of the document editing system will now be described by reference to corresponding drawings. FIG. 11 is a flowchart showing the flow of operation of the document editing means 3 of the document editing system. The document editing means 3 accesses the document area management means 1 each time a change arises in the text information about the composite document, to thereby perform a writing operation for sequentially updating the tag information management table. The change in the text information signifies the editing of a text performed by the document editing system and is synonymous with operations performed by an ordinary editor, such as insertion and deletion of characters or a cut-and-paste operation.

In the document editing system, a text being displayed is usually in an editable state, and updating of a text and updating of the tag information management table of the document area management means 1 must be performed in parallel with each other. For these reasons, the processing shown in FIG. 11 is repeatedly performed during the course of editing of a text. Acquisition of information about the position of a cursor within a composite document (step 1100) is taken as a point of origin of text editing at which the document editing means 3 initiates processing. A determination is made as to whether or not a character string has been selected (step 1101). If it is determined that a character string has been selected, information about the thus selected character string is acquired (step 1102). A determination is then made as to whether the editing corresponds to addition or deletion of characters (step 1103). In the case of addition of characters, the document editing means 3 performs addition of a character string corresponding to the entry of a character string, through pasting or addition of a character string corresponding to characters entered by way of a character input device (step 1104). Subsequently, the selected character string is deleted (step 1105). A determination is made as to whether or not the tagged document area disappears, by means of retrieving tagging information from the tag information management table of the document area management means 1 (step 1106). If tagging information is retrieved, a target element corresponding to the tagging information is deleted from the tag information management table (step 1107). The amount of changes arising in the character indices is computed on the basis of a difference between the character indices before changing of a text and the character indices after changing of the text, as well as on the basis of the information about the position of the cursor (step 1108). Finally, the document editing means 3 accesses the tag information management table of the document area management means 1, to thereby retrieve elements to be updated and update a tag attribute value corresponding to the thus calculated amount of changes in the character indices (i.e., the index of a start tag and the index of an end tag) (step 1112).

If it is determined that a character string has not been selected (step 1101), a determination is made as to whether the edition corresponds to addition or deletion of a character string (step 1109). If the editing corresponds to deletion of characters (step 1110), processing jumps to a determination as to whether or not the tagged document has disappeared (step 1106). In contrast, if the editing corresponds to addition of a character string, the document editing means 3 performs addition of a character string through pasting or addition of a character string corresponding to characters entered by way of a character input device, such as a keyboard (step 1111). Processing then jumps to calculation of the amount of changes arising in the index of a start tag and the index of an end tag (step 1108). Subsequently, in step 1112 there is performed processing which is the same as that performed in the case where a character string has been selected in step 1101.

Operation of the link management means 4, that of the linked document storage device 5, and that of the document output means 6 in the document editing system will now be described by reference to corresponding drawings.

The document editing system has a menu for relating another document to the entirety or arbitrary portions of a composite document, or the function of receiving an input entered by the user by means of key-operation of a so-called shortcut key.

Figure 12:
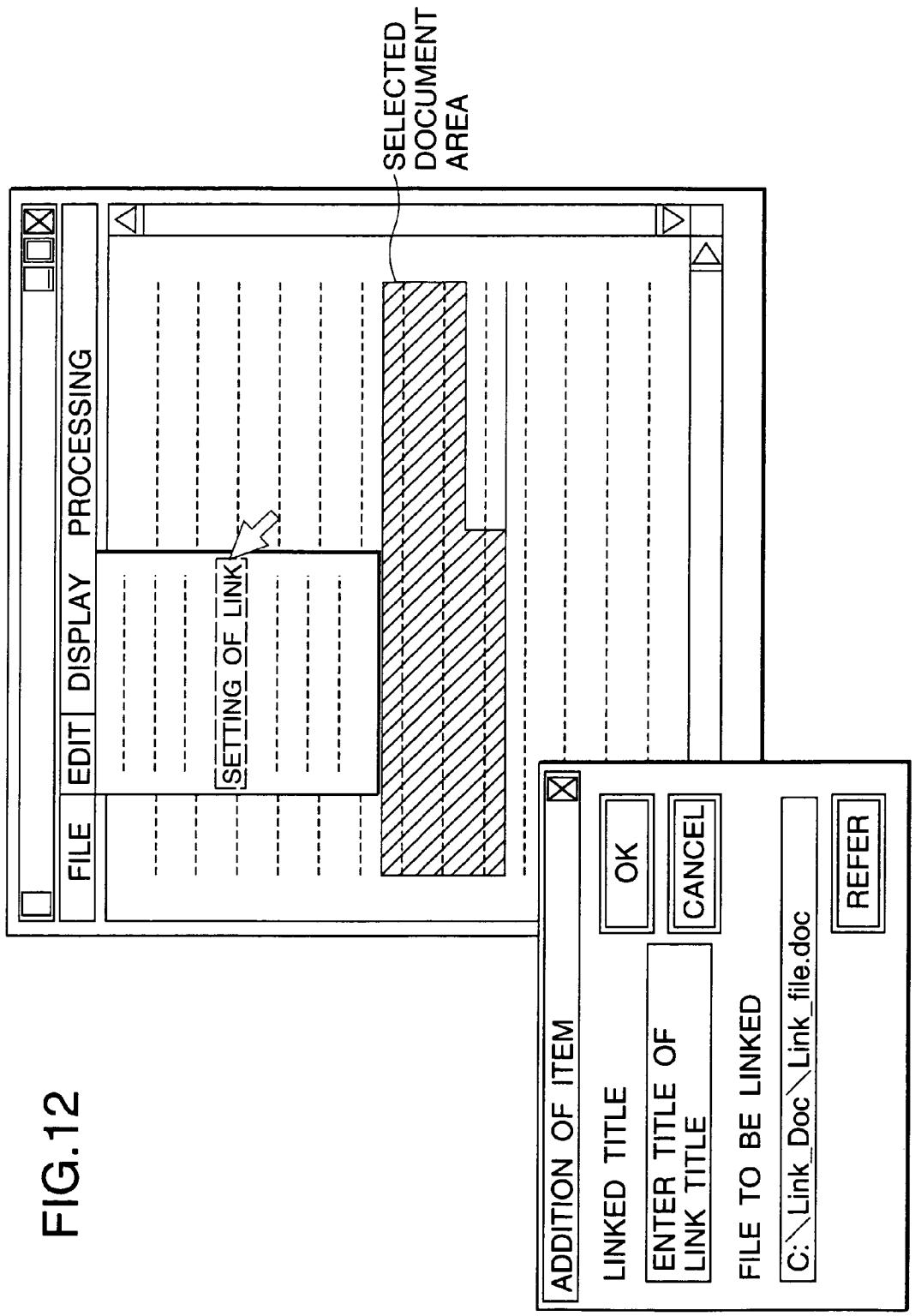
FIG. 12 is an illustration depicting an example display screen about an operation for relating another document to the composite document according to the embodiment shown in FIG. 1.

FIG. 12 shows an example operation for relating another document to a composite document. In this example, after selection of a document area desired to be linked to the composite document, there is selected a "Link setting" which is a sub-menu of an "Editing" menu of the menu bar, to thereby enter a title to be linked in a displayed "addition of an item" dialogue box. Entry of a path to another file to be linked to the composite document or specification of a file through use of a "reference" button is performed, whereupon processing is passed to the tag management means 2. Accordingly, the tag information used for relating another file to the composite document is registered in the tag information management table of the document area management means 1.

FIG. 13 is a flowchart showing the flow of operation in which the document linked to the composite document is displayed by the link management means 4, the linked document storage device 5, and the linked document output means 6 of the document editing system.

In the document editing system, the linked document storage device 5 holds a plurality of documents linked to the composite document, and the link management means 4 manages whether to display the documents linked to the composite document. Further, the linked document output means 6 displays information about the documents linked to the composite document. In order to implement these operations, the tag for relating other documents to the composite document is additionally assigned paths to the documents to be linked, as an extended tag attribute, such as 'href="C:/Link_Doc/Link.file.doc"'.

The link management means 4 determines whether or not all the other documents linked to the composite document are displayed (step 1300). In a case where the user designates all the documents linked to the composite document as not being displayed, the position of a pointer, such as a mouse cursor, is monitored at all times (step 1301). In comparison with the information about a document area linked to another document, which information has been acquired from the tag information management table of the document area management means 1 beforehand through access (step 1302), if the pointer is located in a document area linked to other documents, the link management means 4 accesses the tag information management table of the document area management means 1, thus acquiring paths to all the documents linked to the current position of the pointer (step 1303) and retrieving linked files from the linked document storage device 5 (step 1304). If no corresponding file is found, an error occurs. In contrast, if corresponding files are found, information about the files is passed to the linked document output means 6. The linked document output means 6 displays, as a single information piece and in a list, (1) buttons which can be opened by application software defining the link of the linked files stored in the linked document storage device 5 (in fact, the buttons are called shortcut icons); (2) the titles of linked documents; (3) the number of files linked to the composite document; (4) the actual file names; and (5) tag ID numbers (step 1305).

If in step 1300 the user designates all the documents linked to the composite documents being displayed, monitoring of the position of the pointer in the composite document is not performed, and the link management means 4 accesses the tag information management table of the document area management means 1, thus acquiring information about paths to all the documents linked to the composite document (step 1306). Subsequently, in the same manner as mentioned previously, the linked document output means 6 displays, in a list, information about all the documents linked to the displayed composite document, the information being stored in the linked document storage device 5. Alternatively, all the documents linked to the displayed composite document may be linked to an arbitrary document area.

Figure 14A:
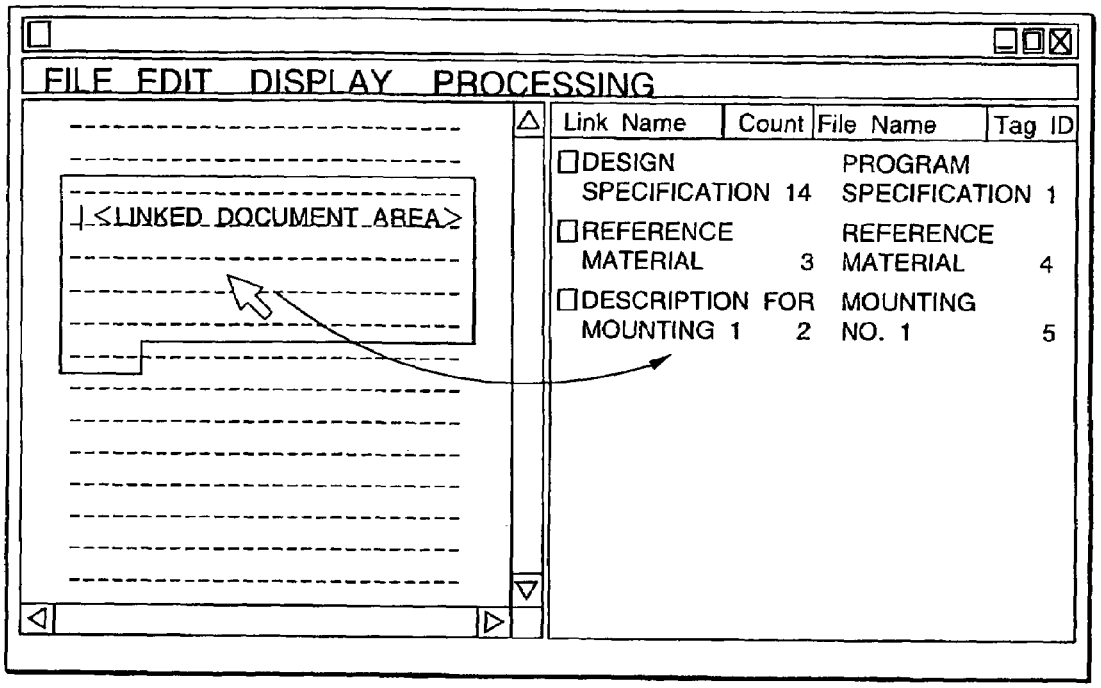
FIGS. 14A and 14B are illustrations depicting an example screen display for displaying information about the document linked to the composite document according to the embodiment shown in FIG. 1.

FIG. 14A shows an example screen display, indicating information about documents linked to a document area in the document editing system in a case where a pointer is located within the document area.

In the drawing, a text is displayed in a list provided on the left side of the screen display, and information about the documents linked to the position of the pointer within the text is displayed in a list provided on the right side of the screen display. In view of the characteristic of a composite document, there may be a case where the pointer is located at any position within a plurality of document areas linked to other documents. In such a case, documents linked to the respective document area are displayed in a right-side list field section.

A "Link Name" column in the right-side list display section shows titles of documents linked to shortcut icons. A "Count" column shows the number of documents linked to the composite document, and a "File Name" column shows actual names of the files stored in the linked document storage device 5. A "Tag ID" column shows tag ID numbers stored in the tag information management table of the document area management means 1. Display or non-display of the right side list field section—in which the information about linked documents is to be displayed—can be freely switched by the user.

Figure 14B:
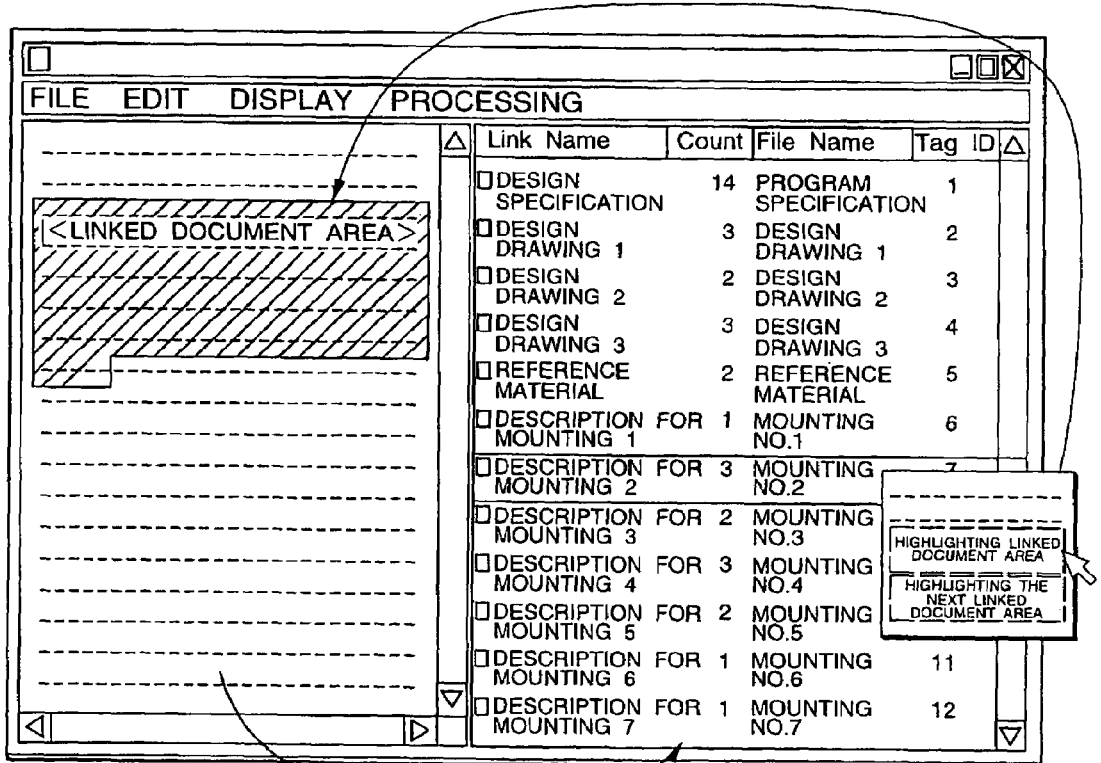

FIG. 14B shows an example screen display, indicating information about all the documents linked to a composite document in the document editing system, in a case where in step 1300 shown in FIG. 13 the user has specified all the documents linked to the composite document as being displayed. Since all the documents linked to the composite document are displayed, a linked document area of the composite document can be reversely indexed by means of opening a sub-menu, as shown in FIG. 14B, and selecting menu "reverse indication of a linked document area." In a case where a plurality of document areas of the composite document are linked to other documents, a sub-menu "reverse indication of the next document area" is selected, to thereby enable sequential reverse indication of linked document areas. In this case, since a linked document entitled "Mount Explanation 2" assumes a count value of 3, it is determined that the document is linked to three document areas within the composite document. These three document areas are sequentially selected and displayed by means of selecting the sub-menu "Reverse indication of the next document area."

The operation of the display format management means 7 and that of the document output means 8 of the document editing system will now be described by reference to corresponding drawings. The document editing system can output a composite document in a prepared display format, in accordance with the tagging information assigned to the composite document. The display format management means 7 and the document output means 8 operate differently according to a display format.

Figure 15:
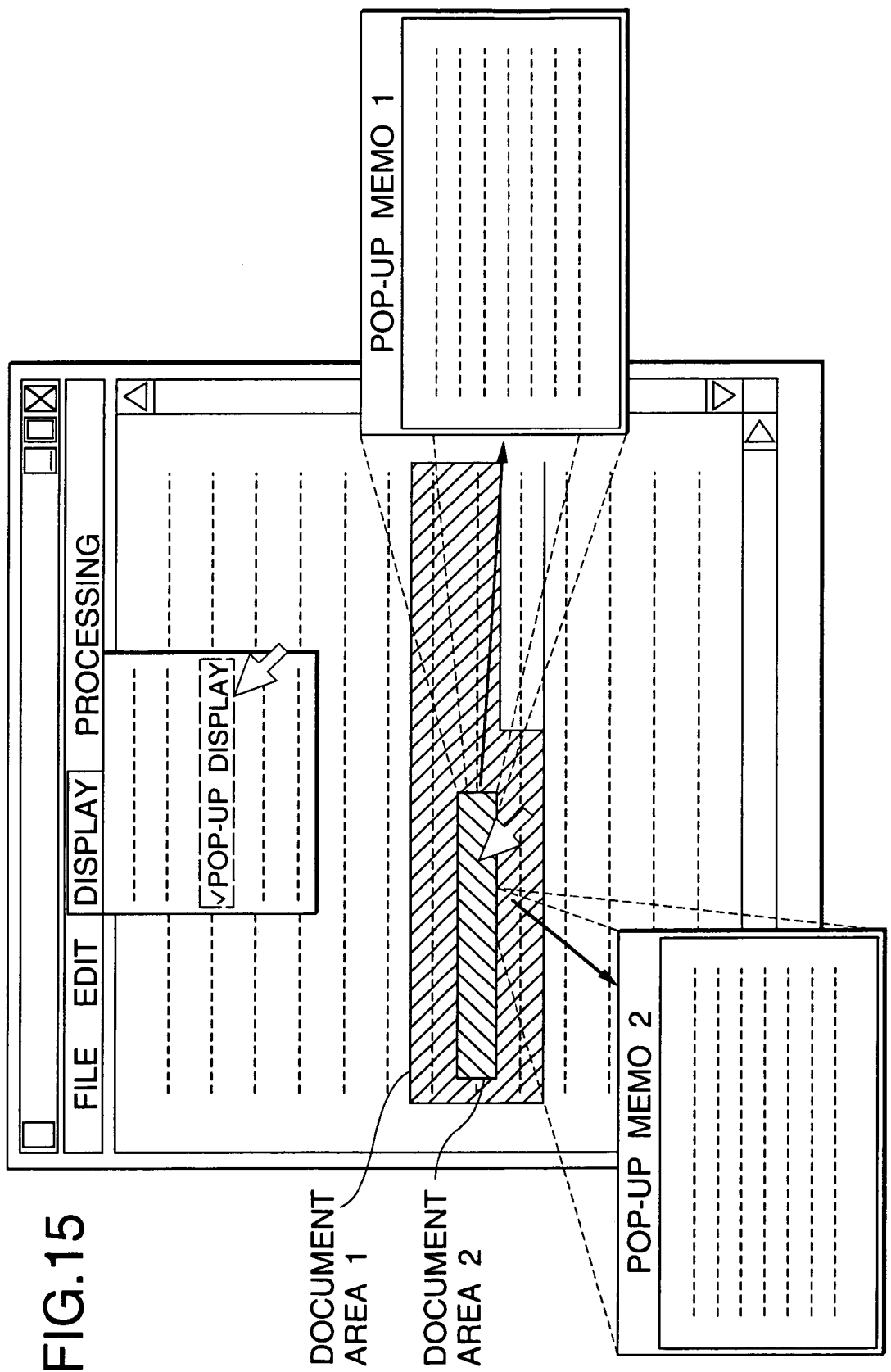
FIG. 15 is an illustration depicting an example screen display for displaying the composite document according to the embodiment shown in FIG. 1 in a specified display format.

FIG. 15 shows an example display, showing a case where the user can select and use a display format for displaying an editable text filed in the form of a pop-up menu, when a predetermined period of time has lapsed since a point, such as a mouse cursor, has entered an arbitrary document area within a composite document displayed by the document editing system or when the document area is clicked or double-clicked by the mouse cursor. Setting of the requirements for displaying a pop-up menu can be changed.

The user can switch between activation of the display format and deactivation of the display format by means of checking a sub-menu "Pop-up Display" of the menu "Display" provided in the menu bar. In order to implement the display format, a tag for assigning to the composite document the function of displaying a text field in the form of a pop-up menu is additionally provided with 'pum="' and the memo edited by the user is stored here as ¥n text information¥n¥r' as an extended tag attribute for retaining a memo edited by the user as text information.

In the display format shown in FIG. 15, after having received the designation of display format from the user, the display format management means 7 operates in substantially the same manner as the previously-described link management means 4. More specifically, the display format management means 7 monitors the position of a pointer, such as a mouse cursor, within the composite document. Further, in comparison with the information about the document area having the memo function of displaying a text field in the form of a pop-up menu, the information having been acquired through access to the tag information management table of the document area management means 1 in advance, if it is determined that the pointer is located at the document area having the memo function, the display format management means 7 accesses the tag information management table of the document area management means 1, to thereby display all text fields to be displayed, in the form of a pop-up menu at the current position of the pointer. The information stored in the respective text field as an extended tag attribute is output.

The document editing system has a menu for setting a document area having the function of displaying an editable text field in the form of a pop-up menu, or the function of receiving an input entered by the user by means of key operation of a so-called shortcut key.

FIG. 16 shows an example operation for setting, in a composite document, a document area having the function of displaying an editable text field in the form of a pop-up menu. In this example, after selection of a document area for which a text field is desired to be set, there is selected "Setting of a pop-up memo" which is a sub-menu of an "Editing" menu of the menu bar, to thereby enter a title of memo information in a displayed "Addition of a pop-up memo" dialogue. As a result, an editable text field is displayed. The user enters a text into the displayed text field, whereby the document area and the entered text information are passed to the tag management means 2. The tag management means 2 registers tag information into the tag information management table.

Figure 17A:
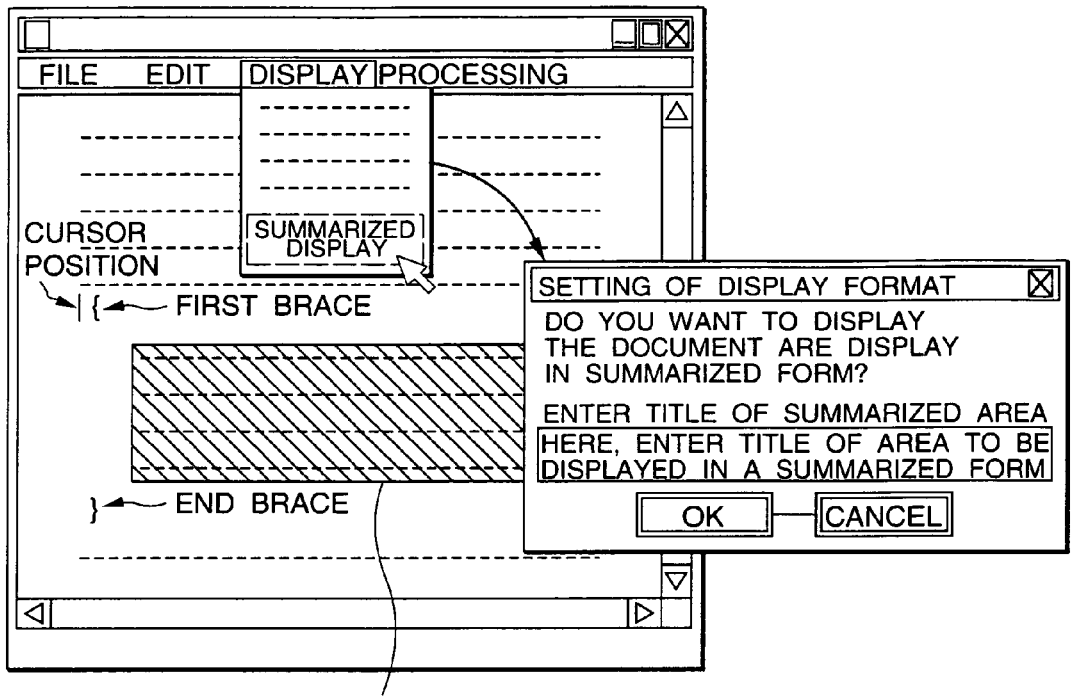
FIGS. 17A and 17B are illustrations depicting an example screen display for displaying the composite document according to the embodiment shown in FIG. 1 in a specified display format.
Figure 17B:
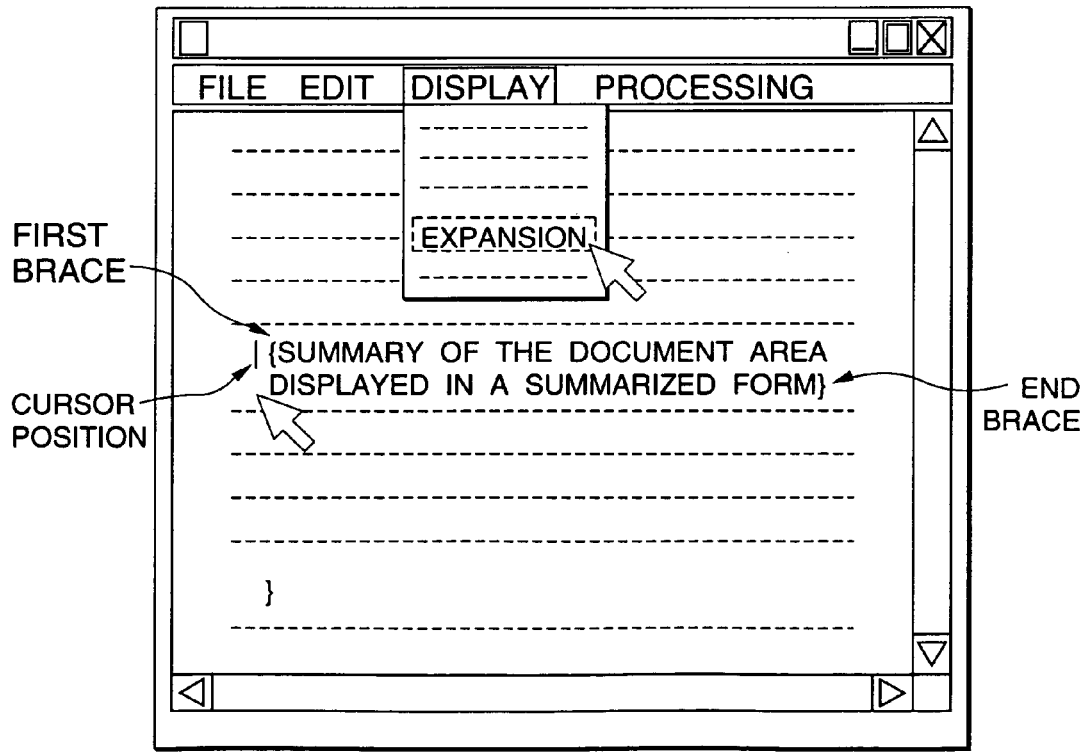

FIGS. 17A and 17B show example displays, in which the user changes the format of display of a composite document by selectively switching a display format capable of displaying in a summarized form a document area sandwiched between braces, the braces constituting an arbitrary pair, within a text (a source code) displayed by the document editing system. FIG. 17A shows an example in which the user selects summarized indication of a text, and FIG. 17B shows an example in which a document area, which has already been displayed in a summarized form, is expanded and re-displayed. Here, braces constituting a pair designate a paired "{" and "}," which is consistent as an element of program within the source code.

The document editing system has a menu for setting a document area to be displayed in a summarized form, or the function of receiving an input entered by the user by means of key operation of a so-called shortcut key.

The operation of the display format management means 7 employed in the example shown in FIG. 17A is commenced by the user of the document editing system invoking or selecting a sub-menu "Summarized display" of the "Display" menu provided in the menu bar. In one method, the user selects beforehand the document area defined by braces "{" and "}," which are consistent as elements of the program within the source code. In another method, the user specifies a document area sandwiched between a paired "{" and "}," which are consistent as elements of the program within the source code, by means of pointing the "{" with the cursor pointer, thus enabling unique discrimination of the document area. According to either of the methods, the document area—which is sandwiched between the braces being paired up with each other and which the user desires to indicate in a summarized form—is discriminated, and the thus discriminated document area is highlighted by means of, for example, reverse indication. As represented by the example shown in FIG. 17A, the display format management means 7 can receive additional information with regard to the document area which is desired to be displayed in a summarized form and is sandwiched between the brace pair, by means of a dialogue box for receiving an input entered by the user.

After having received the display format specified by the user and accompanying information, the display format management means 7 passes the thus received display format and information to the tag management means 2 and the document output means 8.

The tag management means 2 accesses the document area management means 1, to thereby prepare one element of the tag information management table pertaining to a tag for summarized display purpose. The tag ID number and the title of the display area to be displayed in a summarized form are stored as tag attributes, and a character string located within the document area that has been highlighted thus far is stored as an extended tag attribute. At this time, the document area management means 1 stores, as elements, information about the start index and end index of the specified document area, into the tag information management table prepared by the tag management means 2.

In the case of a display format for summarizing a document area, the display format specified by the user can be expressed by means of replacing the document area to be displayed in a summarized form with a character string of a title provided in a summarized display area. Accordingly, the document output means 8 sends a request to the document editing means 8 for replacing a document area to be displayed in a summarized form with a character string of a title provided in a summarized display area.

The operation of the display format management means 7 employed in the example shown in FIG. 17B is commenced by means of the user of the document editing system invoking or selecting a sub-menu "Expansion" of the menu "display" provided in the menu bar. In one method, the user selects beforehand the document area which has been displayed in a summarized manner. In another method, the user specifies the document area which has been displayed in a summarized manner, by means of pointing the "{" with the cursor pointer, thus enabling unique discrimination of the displayed document area. According to either of the methods, the document area—which the user desires to indicate in a summarized form—is discriminated. The tag information management table of the document area management means 1 is accessed, to thereby acquire a character string of the document area which has been saved as an extended tag attribute and is displayed in a summarized manner. The thus acquired character string is passed to and processed by the document output means 8. In the case of expansion of the summarized document area, the summarized document area can be expanded by means of merely replacing, with a character string saved for summarized display purpose, a summarized display title character string provided within the document area which is displayed in a summarized form. The document output means 8 sends a request to the document editing means 3 for replacing, with a character string saved for summarized display purpose, a summarized display title character string provided within the document area which is displayed in a summarized form, thus expanding the document area which has been displayed in a summarized manner.

Figure 18:
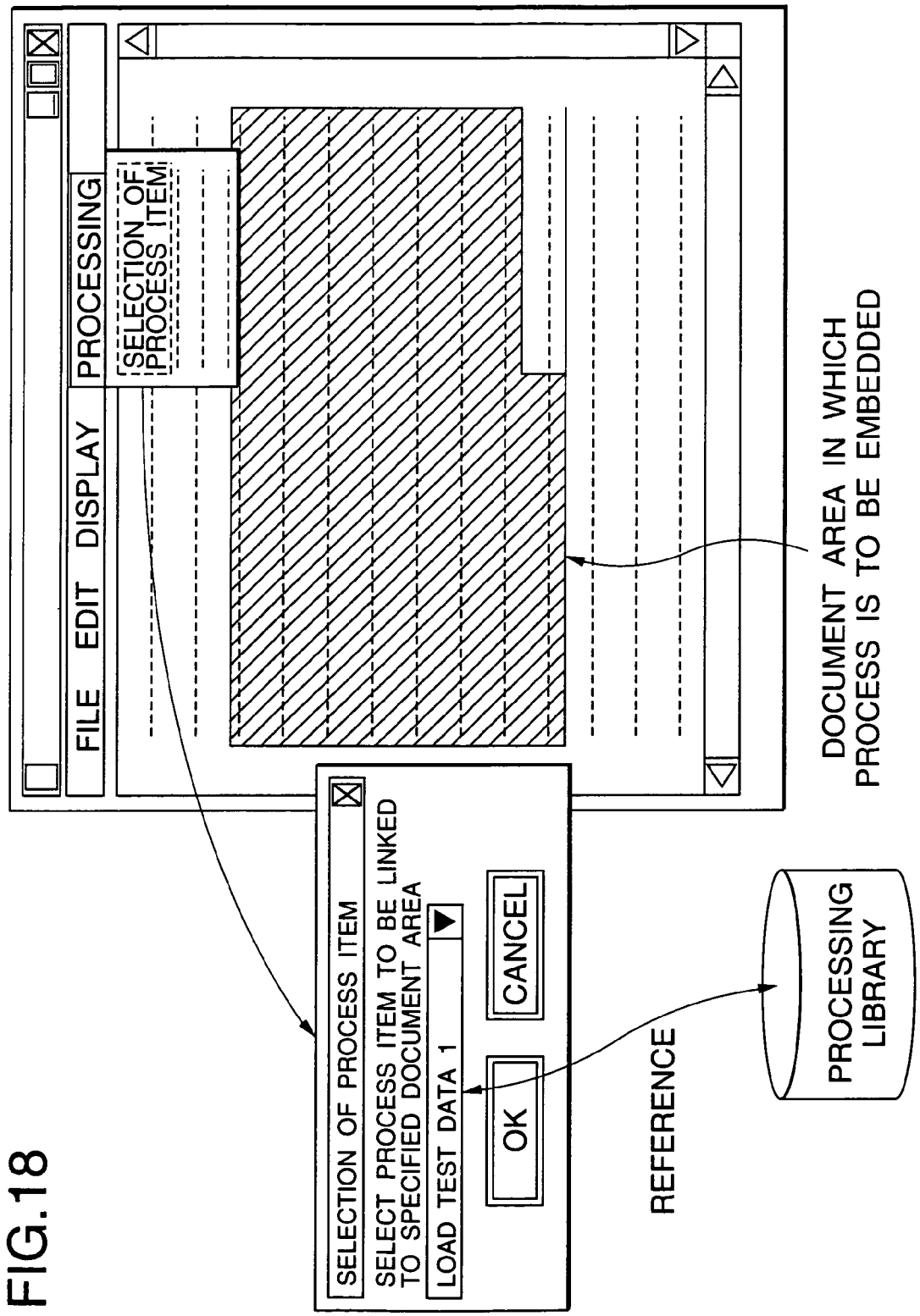
FIG. 18 is an illustration depicting an example screen display for embedding a trigger for executing a specified processing operation into the document area of the composite document according to the embodiment shown in FIG. 1.

The operation of the processing interface management means 9 and that of the processing library 10 of the document editing system will now be described by reference to corresponding drawings. FIG. 18 shows an example display screen in which, from among predefined process items which are registered in the processing library 10 and provided by way of the processing interface management means 9, the user of the document editing system selects a desired processing operation with respect to an arbitrary document area within a composite document, to thereby impart to the document area an attribute as a trigger for executing the thus selected processing operation.

The document editing system has a menu for setting a document area desired to be linked to any one of the predefined process items registered in the processing library 10, or the function of receiving an input entered by the user by means of key operation of a so-called shortcut key.

After the user has selected an arbitrary document area within a composite document desired to be linked to any one of the predefined process items registered in the processing library 10, the processing interface management means 9 provided in the example shown in FIG. 18 selects a sub-menu "Selection of a process item" of the "Process" menu provided in the menu bar and displays a "Selection of a process item" dialogue box. The predefined process items registered in the processing library 10 correspond to files written in a script language or executable files. In some cases, the predefined process items may be accompanied by data files. Predefined process items can be freely changed, or registered in or deleted from the processing library 10.

The "Selection of a process item" dialogue box has the function of selecting the predefined process items registered in the processing library 10. By means of the function of the processing library 10, the user can select a desired predefined process and embed, in the selected document area within the composite document, a trigger for executing the thus selected predefined process. In this way, the attribute for executing the process linked to the specified document area is appended to the document area. At this time, the processing interface management means 9 sends a request to the tag management means 2 for registering a trigger required for relating a predefined process to the selected document area within the composite document and executing the thus linked predefined process. When the tag management means 2 registers tag information into the tag information management table of the document area management means 1, the tag information is additionally provided with extended tag attributes for relating the specified predefined process with the document area; for example, a tag attribute for defining a path to the specified predefined process, such as 'href="C:/Link_Scrip/Test01.cgi"' and a tag attribute for selecting a corresponding execution trigger assigned to the specified predefined process, such as 'trig="1"'. A trigger required for executing a predefined process is dependent on the predefined process item registered in the processing library 10.

Figure 19:
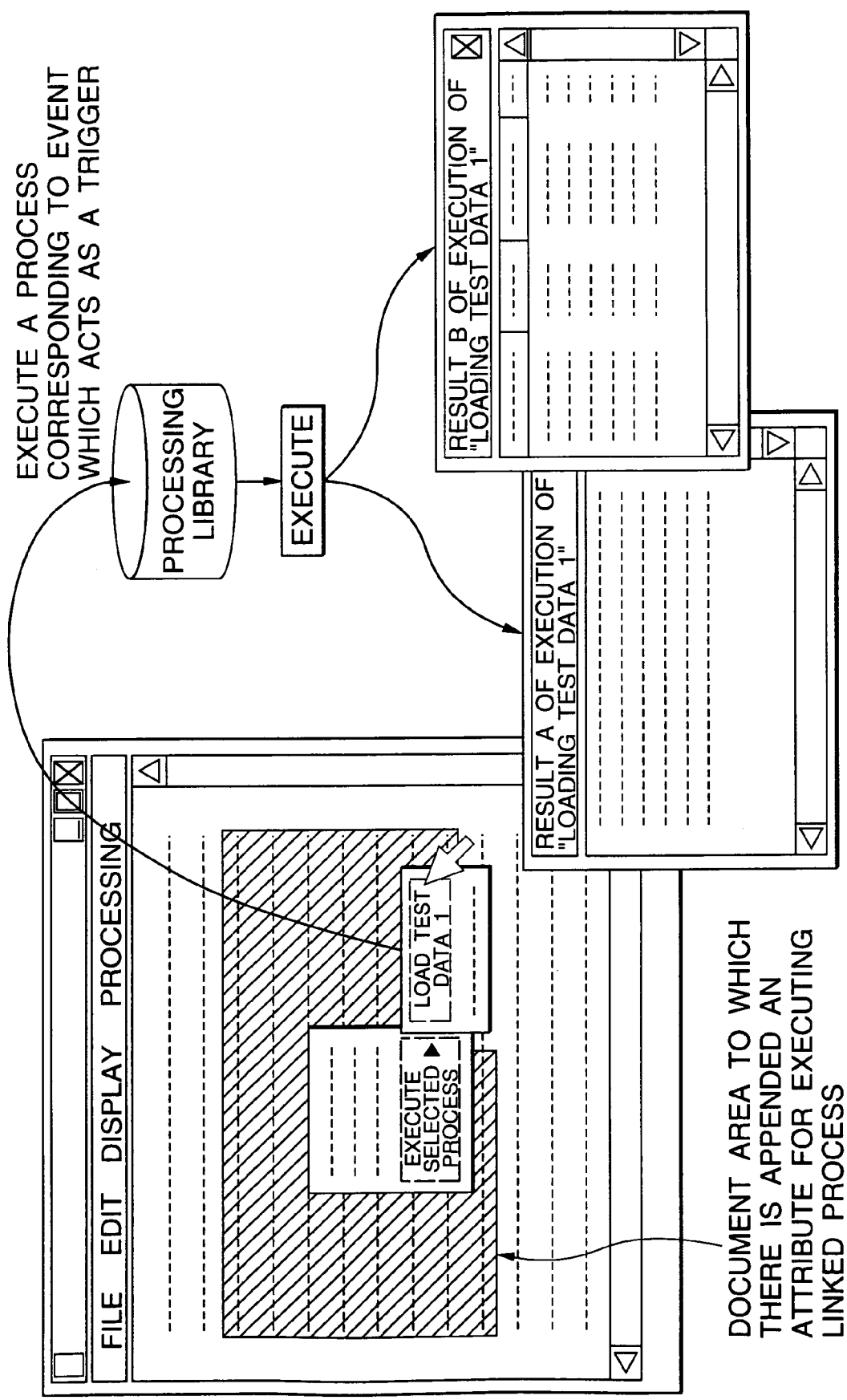
FIG. 19 is an illustration depicting an example screen display for performing the process specified for the document area of the composite document according to the embodiment shown in FIG. 1.

FIG. 19 depicts an example screen display of the document editing system, showing execution of a linked predefined process in response to an event which acts as a trigger set for the document area assigned an attribute for executing the linked predefined process.

In the example shown in FIG. 19, an attributes for executing a predefined process "Loading of test data 1" specified by the user is appended to the specified document area. An event which acts as a trigger for executing a predefined process arises by means of selecting a menu "Loading of test data 1" indicated in the sub-menu "Execution of selected process" of a pull-down menu with regard to the specified document-area.

The processing interface management means 9 accesses the tag information management table of the document area management means 1, to thereby acquire information about the document area assigned an attribute for executing a predefined process linked to the document area and monitor an event which acts as a trigger to be activated by the user. In a case where the operation performed by the user triggers a predefined process, a corresponding predefined process is called from the processing library 10 and is executed. The result of execution of the predefined process is returned. Depending on the nature of a predefined process, entry of a value or data file may be required before execution of a predefined process, or a plurality of execution results or a plurality of types of execution results may arise.

The operations of the constituent elements of the document editing system of the present invention; namely, the operation of the document management means 1, that of the tag management means 2, that of the document editing means 3, that of the link management means 4, that of the linked document storage device 5, that of the linked document output means 6, that of the display format management means 7, that of the document output means 8, that of the processing interface management means 9, and that of the processing library 10 have been described thus far in connection with the respective previously-described characteristics of the composite document, specifically:

(1) a composite document which, in its entirety or in arbitrary positions, can be linked to another document;

(2) a composite document for which an arbitrary display format is set; and (3) a composite document for which a trigger is set for relating arbitrary processing to the document or for executing arbitrary processing.

Functions which can be embodied by combination of these features will now be described by reference to examples.

<Example Function Embodied by combination of Characteristics (1) and (2)>

There can be embodied a function of relating a document area specified by the user to another document and displaying the thus linked another document in the same manner as does a memo for effecting a pop-up menu provided in the example shown in FIG. 15.

Such a function can be embodied by means a document editing system for editing a document in a computer, the system comprising:

document area management means for discriminating a plurality of types of document areas or a plurality of document areas specified within an arbitrary area of the document and managing the document areas along with attributes assigned thereto;

tag management means for managing generation and deletion of a tag pair, that is, a start tag and an end tag, which uniquely correspond to each other and specify a document area;

document editing means for editing a character sequence provided in the document while information about the specified document-area within the document is retained or updated;

link management means for performing a management operation so as to relate one or a plurality of documents to the specified document area and passing information about the link to the document area management means;

linked document output means for outputting the document linked by the link management means, by reference to information about the document area managed by the document area management means;

display format management means for managing an arbitrary display format assigned to the document area managed by the document area management means; and document output means for outputting the document area managed by the document area management means, in an arbitrary expression formation provided in the display format management means.

Functions which can be embodied by combination of these features will now be described by reference to examples.

<Example Function Embodied by Combination of Characteristics (1) and (3)>

There can be embodied a function of appending to the document area specified by the user an attribute for executing a certain predefined process and outputting and reserving an execution result as a file, as in the case of the example shown in FIG. 18, as well as of relating the thus-output file to the specified document area as a log file.

Such a function can be embodied by means a document editing system for editing a document in a computer, the system comprising:

document area management means for accurately discriminating a plurality of types of document areas or a plurality of document areas specified within an arbitrary area of the document and managing the document areas along with attributes assigned thereto;

tag management means for managing generation and deletion of a tag pair, that is, a start tag and an end tag, which uniquely correspond to each other and specify a document area;

document editing means for editing a character sequence provided in the document while information about the specified document area within the document is retained or updated;

link management means for performing a management operation so as to relate another document to the specified document area and passing information about the link to the document area management means;

linked document output means for outputting the document linked by the link management means, by reference to information about the document area managed by the document area management means;

processing interface management means for performing a management operation so as to relate an arbitrary process to the specified document area such that a trigger for executing the process is set for the specified document, as well as to pass information about the link to the document area management means; and a processing library for storing, such as a library, the arbitrary processes linked to the specified document area by the processing interface management means.

<Example Function Embodied by Combination of Characteristics (2) and (3)>

There can be embodied a function of appending to a document area specified by the user an attribute for setting a display format for protecting and encrypting the specified document area, for setting a password for the document area, and for enabling decryption of the thus protected and encrypted document area through use of only a correct password.

Such a function can be embodied by means a document editing system for editing a document in a computer, the system comprising:

document area management means for accurately discriminating a plurality of document areas specified within the entirety of the document or arbitrary portions thereof and managing the document areas along with attributes assigned thereto;

tag management means for managing generation and deletion of a tag pair, that is, a start tag and an end tag, which uniquely correspond to each other and specify a document area;

document editing means for editing a character sequence provided in the document while information about the specified document area within the document is retained or updated;

display format management means for managing an arbitrary display format assigned to the document area managed by the document management means;

document output means for outputting the document managed by the document area management means, in an arbitrary expression format provided in the display format management means; processing interface management means for performing-a management operation so as to relate an arbitrary process to the specified document area such that a trigger for executing the process is set for the specified document, as well as to pass information about the link to the document area management means; and a processing library for storing, such as a library, the arbitrary processes linked to the specified document area by the processing interface management means.

<Example Function Embodied by Combination of Characteristics (1), (2), and (3)>

There can be embodied a function of:

appending to a document area specified by the user an attribute for shaping the document area according to a certain format, reserving, in the form of one or a plurality of files, source code relating to the document area before and after shaping and log data pertaining to the shaping operation, and outputting the file;

relating the thus output one file or the plurality of files to the specified document area as a file(s) for managing a format; and displaying the specified document area while the source code before shaping with the source code after shaping.

Such a function can be embodied by means a document editing system for editing a document in a computer, the system comprising:

document area management means for accurately discriminating a plurality of document areas specified within the entirety of the document or arbitrary portions thereof and managing the document areas along with attributes assigned thereto;

tag management means for managing generation and deletion of a tag pair, that is, a start tag and an end tag, which uniquely correspond to each other and specify a document area;

document editing means for editing a character sequence provided in the document while information about the specified document area within the document is retained or updated;

link management means for performing a management operation so as to relate another document to the specified document area and passing information about the link to the document area management means;

linked document output means for outputting the document linked by the link management means, by reference to information about the document area managed by the document area management means;

display format management means for managing an arbitrary display format assigned to the document area managed by the document management means;

document output means for outputting the document managed by the document area management means, in an arbitrary expression format provided in the display format management means;

processing interface management means for performing-a management operation so as to relate an arbitrary process to the specified document area such that a trigger for executing the process is set for the specified document, as well as to pass information about the link to the document area management means; and a processing library for storing, such as a library, the arbitrary processes linked to the specified document area by the processing interface management means.

As mentioned above, many functions can be embodied by combination of the previously-defined characteristics of the composite document. As a matter of course, other various functions may be embodied by combination of Characteristics (1), (2), and (3) of the composite document while the expressions of the characteristics are modified.

Although the previous embodiment has described a case where a source code is used as an example composite document, an ordinary document written in, for example, a natural language, other than the source code can be changed into a composite document, by adoption of the method of the present invention.

As has been described above, the document editing system of the present invention enables an increase in the degree of freedom in specifying a document area to be assigned an attribute when an arbitrary attribute is assigned to a document. Consequently, relating another document to a document, selection of an arbitrary display format, embedding an arbitrary process in the document, and combination thereof can be flexibly handled.

Further, the method of the present invention for preparing a tag information management table enables specifying of a plurality of document areas which are nested or which partially overlap, through use of tags of the same type, thereby providing a tag information management table capable of uniquely discriminating the document areas one from another.

What is claimed is:

1. A document editing system for editing a document in a computer, comprising:

means for discriminating a specified plurality of document areas within an arbitrary area of the document and managing the specified plurality of document areas along with attributes assigned thereto;

means for managing generation and deletion of a tag pair in the document, said tag pair defining a document area and including a start tag that identifies a start of the document area, an end tag that identifies an end of the document area, and a unique identifier which is attached to each start and end tag, wherein said unique identifier is uniquely associated only with the document area defined by the tag pair, each start and end tag includes an attachment symbol, and said unique identifier is attached to each start tag and each end tag by the attachment symbol; and means for editing a character sequence provided in the document while information about the specified plurality of document areas within the document is retained or updated.

2. The document editing system as claimed in claim 1, wherein said specified plurality of document areas comprise a plurality of types of document areas.

3. The document editing system as claimed in claim 1, further comprising:

means for linking at least one linked document to the specified plurality of document areas and passing information about the link to said means for discriminating and managing; and first means for outputting the at least one linked document linked by said means for linking at least one linked document, by reference to information about the specified plurality of document areas.

4. The document editing system as claimed in claim 1, wherein said specified plurality of document areas comprise a plurality of document areas specified within the entirety of the document or arbitrary portions thereof, and wherein said document editing system further comprises:

means for managing an arbitrary display format assigned to the specified plurality of document areas; and second means for outputting the document in the arbitrary expression format.

5. The document editing system as claimed in claim 1, further comprising:

means for linking an arbitrary process to the specified plurality of document areas, wherein a trigger to execute the arbitrary process is set for the specified plurality of document areas, and information about the link to the arbitrary process is passed to said means for discriminating and managing; and means for storing the link to the arbitrary process.

6. A computer implemented method of preparing a tag information management table for editing a document, said method comprising:

determining whether or not an arbitrary character string within the document is selected;

acquiring a tag pair in the document, said tag pair including a start tag and an end tag that define a document area, a position of the start tag, a position of the end tag, and a unique tag ID attached to the start tag and the end tag that is uniquely associated only with the document area defined by the tag pair, if it is determined in said determining that the arbitrary character string is selected, said start tag identifying a start of the document area and said end tag identifying the end of the document area defined by the tag pair, each start and end tag includes an attachment symbol, and said unique identifier is attached to each start tag and each end tag by the attachment symbol; and storing a link between the unique tag ID and the tag pair in the tag information management table.

7. A document editing system for editing a document in a computer, comprising:

a tag management module including a tag setting module which sets a tag pair in the document, said tag pair defining an arbitrary area in the document with a unique identifier, said tag pair including a start tag with the unique identifier attached and located at a start portion of the arbitrary area in the document and an end tag with the unique identifier attached and located at an end portion of the arbitrary area in the document, and said tag setting module storing information on said start tag and said end tag, said unique identifier being associated only with the arbitrary area in the document defined by the tag pair, each start and end tag includes an attachment symbol, and said unique identifier is attached to each start tag and each end tag by the attachment symbol; and a document management module which manages said start tag with the unique identifier attached and said end tag with the unique identifier attached when preparing or editing a character sequence in the document and which manages the entire document.

8. A method of editing a document in a computer, comprising:

storing in the document a start tag that identifies a start of an arbitrary area in the document and an end tag that identifies an end of the arbitrary area in the document, wherein a unique identifier is attached to the start tag and the unique identifier is attached to the end tag, said unique identifier being uniquely associated only with the arbitrary area in the document identified by the start tag and the end tag each start and end tag includes an attachment symbol, and said unique identifier is attached to each start tag and each end tag by the attachment symbol; and managing said start tag with the attached unique identifier and said end tag with the attached unique identifier when preparing or editing a character sequence in the document and managing the entire document.

9. A document editing system for editing a document in a computer, comprising:

a document area manager configured to discriminate a specified plurality of document areas within an arbitrary area of the document and configured to manage the specified plurality of document areas along with attributes assigned thereto;

a tag manager configured to manage generation and deletion of a tag pair in each of the plural document areas, each of said tag pairs defining a document area in the specified plural document areas and including a start tag that identifies a start of the document area, an end tag that identifies an end of the document area, and a unique identifier which is attached to each start and end tag, wherein said unique identifier is uniquely associated only with the document area defined by the tag pair, each start and end tag includes an attachment symbol, and said unique identifier is attached to each start tag and each end tag by the attachment symbol; and a document editor configured to edit a character sequence provided in the document while information about the specified plurality of document areas within the document is retained or updated.

10. The document editing system as claimed in claim 9, wherein said specified plurality of document areas comprise a plurality of types of document areas.

11. The document editing system as claimed in claim 9, further comprising:

a link manager configured to link at least one linked document to the specified plurality of document areas and to pass information about the link to said document area manager; and a linked document output section configured to output the at least one linked document linked by said link manager, by reference to information about the specified plurality of document areas managed by said document area manager.

12. The document editing system as claimed in claim 9, wherein said specified plurality of document areas comprise a plurality of document areas specified within the entirety of the document or arbitrary portions thereof, and wherein said document editing system further comprises:

a display format manager configured to manage an arbitrary display format assigned to the specified plurality of document areas; and a second document output section configured to output the document in the arbitrary expression format.

13. The document editing system as claimed in claim 9, further comprising:

a processing interface manager configured to link an arbitrary process to the specified plurality of document areas, wherein a trigger to execute the arbitrary process is set for the specified plurality of document areas, and information about the link to the arbitrary process is passed to said document area manager; and a processing library configured to store the link to the arbitrary process.

14. A computer program product storing computer program instructions which when executed by a computer cause the computer to perform the following steps:

determining whether or not an arbitrary character string within a document is selected;

acquiring a tag pair in the document, said tag pair including a start tag and an end tag that define a document area, a position of the start tag, a position of the end tag, and a unique tag ID attached to the start tag and the end tag that is uniquely associated only with the document area defined by the tag pair, if it is determined in said determining that the arbitrary character string is selected, said start tag identifying a start of the document area and said end tag identifying the end of the document area defined by the tag pair, each start and end tag includes an attachment symbols and said unique identifier is attached to each start tag and each end tag by the attachment symbol; and storing a link between the unique tag ID and the tag pair in the tag information management table.

* * * * *